(12) United States Patent
Cherian et al.

(10) Patent No.: US 11,423,698 B2
(45) Date of Patent: Aug. 23, 2022

(54) ANOMALY DETECTOR FOR DETECTING ANOMALY USING COMPLEMENTARY CLASSIFIERS

(71) Applicant: Mitsubishi Electric Research Laboratories, Inc., Cambridge, MA (US)

(72) Inventors: Anoop Cherian, Belmont, MA (US); Jue Wang, Canberra (AU)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 113 days.

(21) Appl. No.: 17/079,760

(22) Filed: Oct. 26, 2020

(65) Prior Publication Data

US 2022/0129666 A1  Apr. 28, 2022

(51) Int. Cl.
| | | |
|---|---|---|
| *G06K 9/00* | (2022.01) | |
| *G06V 40/00* | (2022.01) | |
| *G06T 7/00* | (2017.01) | |
| *G06V 10/00* | (2022.01) | |
| *G06V 40/20* | (2022.01) | |

(Continued)

(52) U.S. Cl.
CPC .......... *G06V 40/20* (2022.01); *G06K 9/6201* (2013.01); *G06K 9/6217* (2013.01); *G06K 9/6267* (2013.01); *G06T 7/70* (2017.01); *G06V 10/50* (2022.01); *G06V 20/40* (2022.01); *G06V 20/59* (2022.01); *G06V 40/10* (2022.01); *G06T 2207/10016* (2013.01); *G06T 2207/20081* (2013.01); *G06T 2207/30196* (2013.01); *G06T 2207/30268* (2013.01)

(58) Field of Classification Search
None
See application file for complete search history.

(56) References Cited

U.S. PATENT DOCUMENTS 10,861,170 B1 * 12/2020 Li ........................... H04L 69/28
2019/0050690 A1   2/2019  Ukil et al.

FOREIGN PATENT DOCUMENTS

| CN | 104965785 | 10/2015 |
|---|---|---|
| CN | 107564062 | 6/2020 |
| JP | 2019164774 | 9/2019 |

OTHER PUBLICATIONS

Naresh Manwani "Supervised Learning of Piecewise Liunear Models," Mar. 7, 2018, Indian Institute of Science.
(Continued)

*Primary Examiner* — Matthew C Bella
*Assistant Examiner* — Brian D Shin
(74) *Attorney, Agent, or Firm* — Gennadiy Vinokur; Hironori Tsukamoto

(57) ABSTRACT

Embodiments of the present disclosure disclose an anomaly detector for detecting an anomaly in a sequence of poses of a human performing an activity. The anomaly detector includes an input interface configured to accept input data indicative of a distribution of the sequence of poses, a memory configured to store a discriminative one-class classifier having a pair of complementary classifiers bounding normal distribution of pose sequences in a reproducing kernel Hilbert space (RKHS), a processor configured to embed the input data into an element of the RKHS and classify the embedded data using the discriminative one-class classifier, and an output interface configured to render a classification result.

20 Claims, 15 Drawing Sheets

(51) Int. Cl.
*G06T 7/70* (2017.01)
*G06K 9/62* (2022.01)
*G06V 10/50* (2022.01)
*G06V 20/40* (2022.01)
*G06V 20/59* (2022.01)
*G06V 40/10* (2022.01)

(56) References Cited

OTHER PUBLICATIONS

E. Cimen & G. Ozturk. "O-PCF algorithm for one-class classification", Apr. 2020, Faculty of Engineering, Eskisehir Technical University, Eskisehir, Turkey.

* cited by examiner

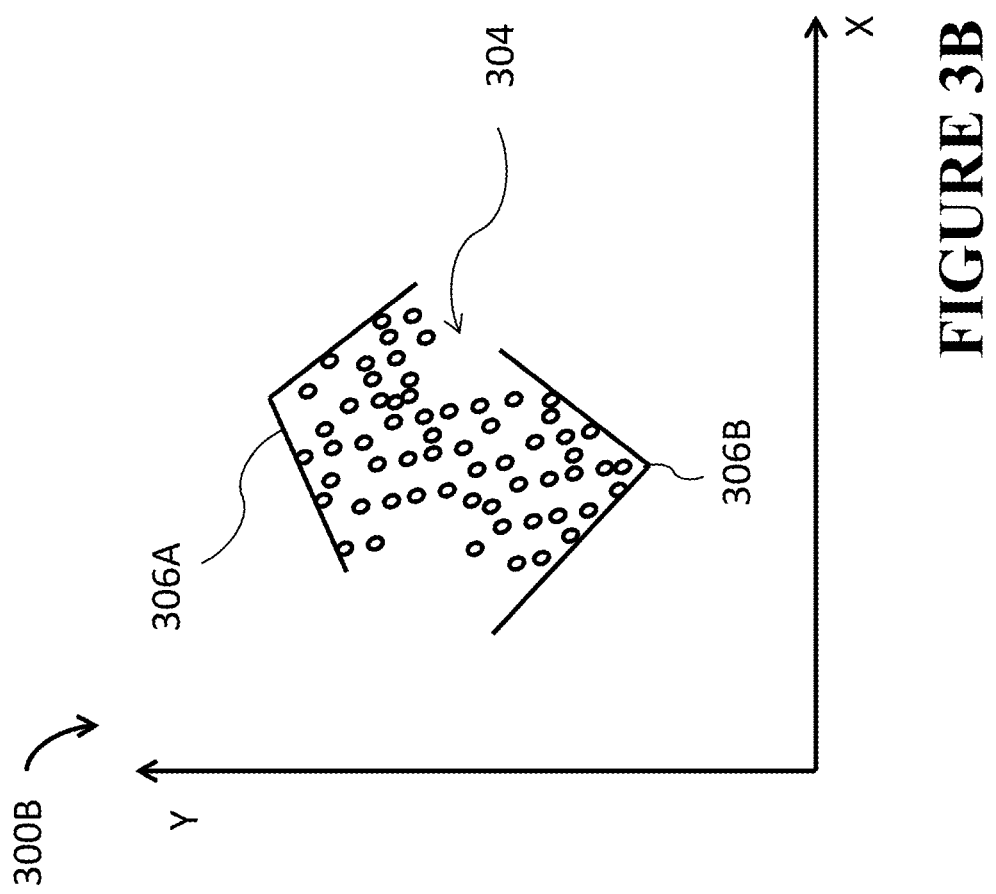

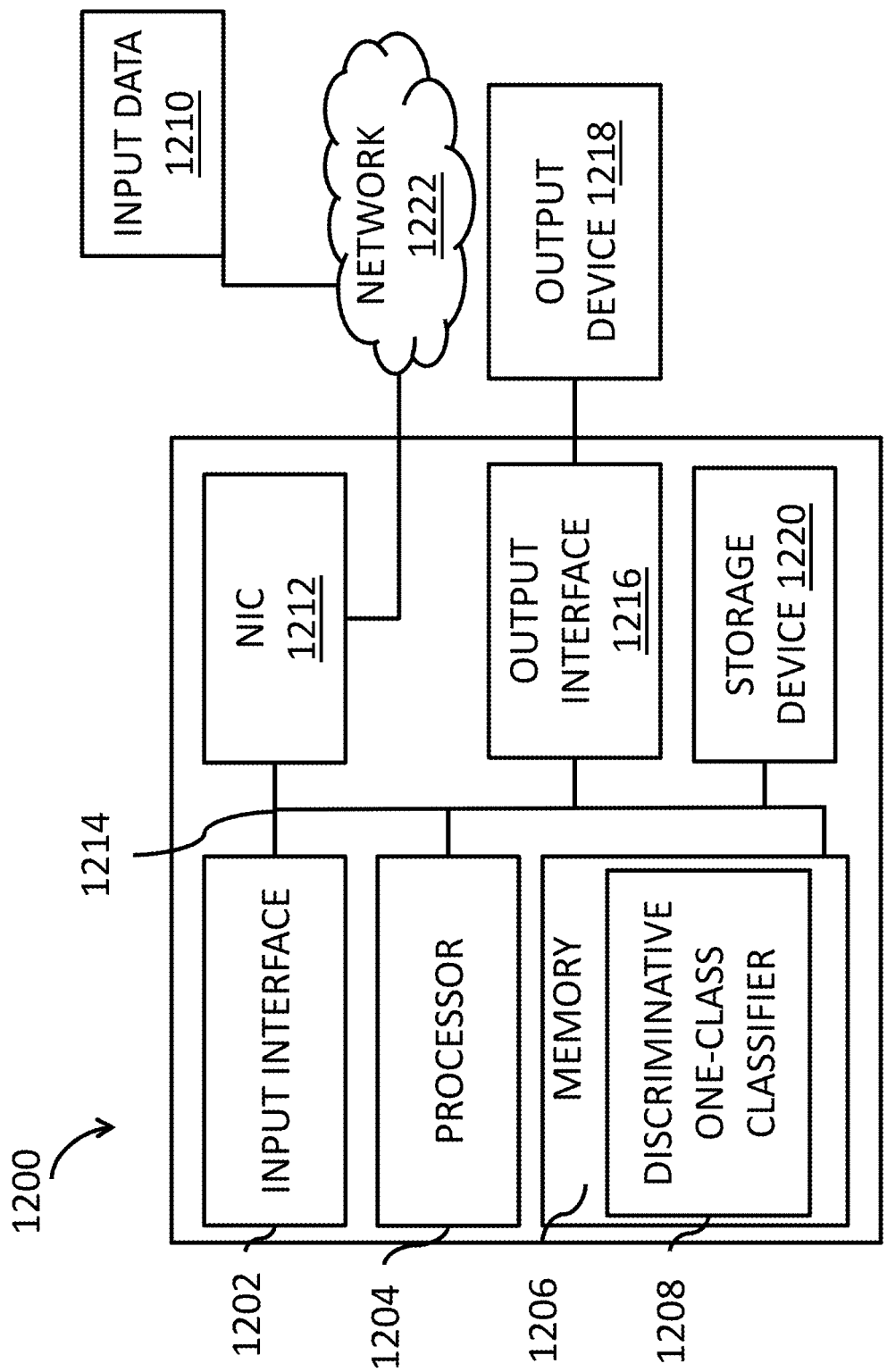

ANOMALY DETECTOR FOR DETECTING ANOMALY USING COMPLEMENTARY CLASSIFIERS

TECHNICAL FIELD

The present disclosure generally relates to anomaly detection, and more specifically to detecting an anomaly in a sequence of human poses using an anomaly detector.

BACKGROUND

Typically, human poses indicate various positions that a wide variety of human bodies may employ during daily, extraordinary, or celebratory circumstances. The human poses may differ widely depending on environment factors, lifestyle factors, or the like. A few common examples of the human poses include standing pose, sitting pose, walking pose, sleeping pose, running pose, etc. Also, a type of human activity performed by different individuals may be understood from such variety of human poses. For example, dancing poses of a dancer may indicate dancing activity, cooking poses of a chef may indicate cooking activity, driving poses of a driver may indicate a driving activity. Hence, human poses of a human are indicative of one or more human activities. Conversely, abnormality in the human poses may be indicative of abnormal human activity.

Nowadays, with advancement in technology and development, it may be desirable to detect anomaly in a pose of a human performing an activity for a number of applications. For example, the anomaly detection in human poses may be useful in security applications, such as driver assisting applications to check the attention of a driver operating a vehicle, in airport security, as well as in health-related applications assisting in taking care of safety of people, or the like.

However, anomaly detection in the human poses may be a challenging task due to factors related to training data or labelled data corresponding to human anomaly poses. Furthermore, there may be difficulty in obtaining the training data for the human anomaly poses due to non-linearity and complexity in the human poses. The complexity and non-linearity in the human poses may be contributed by different variations in human poses from one individual to another individual. Moreover, manually annotating the labeled data may be a mundane and a challenging task.

Accordingly, there is a need of a solution to overcome the above mentioned challenges for the detection of anomaly in human poses in an efficient and feasible manner.

SUMMARY

It is an object of some embodiments to employ an anomaly detector for detection of anomaly poses in a sequence of human poses. It is another object of some embodiments to perform classification of anomaly data corresponding to anomaly human poses from normal data corresponding to normal human poses in the sequence of human poses.

Some embodiments are based on the recognition that non-availability of training data corresponding to anomalous human poses may be addressed by a discriminative one-class classifier. The discriminative one-class classifier allows to train a model using normal poses of a human performing an activity and allows to use the trained model for detecting poses that do not correspond to the normal poses of the human performing the activity, as anomaly poses. To that end, a single discriminative classifier may be trained to detect anomaly in a human performing activity.

Some embodiments are based on the realization that non-linearity and complexity of human poses may be addressed by providing a pair of complementary classifiers rather than providing the single discriminative classifier. To that end, the discriminative one-class classifier includes a pair of complementary classifiers. Each discriminative classifier in the pair of complementary classifiers may be trained to bound a space that corresponds to the normal poses of the human performing the activity from different directions. To that end, the normal data may be bounded within boundary of the pair of complementary classifiers. For example, one half-space (e.g., a positive half-space) of the space that corresponds to the normal poses of human performing the activity may be bounded by one discriminative classifier of the pair of complementary classifiers and another half-space (e.g., a negative half-space) of the space may be bounded by another discriminative classifier of the pair of complementary classifiers.

Further, the pair of complementary classifiers may represent the complexity of the distribution of normal poses of different human activities. For example, the pair of complementary classifiers offers better representational flexibility and more degrees of freedom in characterizing data distribution of the normal poses of the different human activities, while supporting single type of one-class data. However, while replacing a single discriminative classifier with a pair of complementary classifiers solves some problems. However, it creates a number of other problems. Specifically, learning a pair of complementary classifiers on non-linear training data of the human poses may be a non-convex optimization problem.

Some embodiments are based on the realization that the non-convex optimization problem may be addressed with various optimization techniques, e.g., using Riemannian conjugate gradient optimization on the Stiefel manifold. In mathematics, the Stiefel manifold is a set of all orthonormal k-frames. In other words, the Stiefel manifold is a space of orthogonal (linear) hyperplanes. However, it is difficult to apply the Stiefel manifold on arbitrarily shaped boundaries of discriminative classifiers caused by the non-linearity of the human poses.

To that end, it is objective of some embodiments to learn the pair of complementary classifiers in a Hilbert space, such as a reproducing kernel Hilbert space (RKHS). The RKHS provides potentially infinite linear dimensions that ensures boundary of one or more straight lines or hyperplanes of the pair of complementary classifiers are linear. Examples of the linear boundaries may include a pair of straight-line segments (e.g., hyperplanes), a pair of rectilinear and orthogonal (orthonormal) frames, a pair of normal and non-orthogonal frames (e.g., hyperspheres).

Some embodiments may use kernel embedding to project distributions of poses to the RKHS. In some other embodiments, different kernels may be used based on distribution of data of the poses to be classified. For example, some embodiments may use a histogram intersection kernel for the distribution of poses captured by a histogram. Another embodiment may use a Chi-sq kernel for histogram data, a linear kernel or Radial basis function (RBF) kernel may be used for data distributed in spherical-shape, and two complementary RBF kernels may be used for data distributed in ring-shape. Another embodiment may use a tree-kernel for hierarchically structured data.

In various embodiments, the kernel embedding is intermediate and not observed. During training as well as during inference stage of classification of the anomaly poses, the kernel embedding remains internal to optimization and/or the classification. As a result, such a kernel based classification with a pair of complementary classifiers bounding the space of distribution of normal human poses allows reducing the computational complexity of anomaly detection of human activities in a situation when training data of abnormal poses for such an activity are not available.

In some embodiments, the anomaly detection in the human poses may be implemented in an application, e.g., a vehicle driver assistance system for providing safety and security to a driver as well as one or more occupants of a vehicle. To that end, a sequence of image frames comprising one or more images of the one or more occupants in the vehicle may be captured using one or more image capturing devices installed in the vehicle. The sequence of image frames may be provided as an input data for the anomaly detection in poses of the one or more occupants.

Accordingly, one embodiment discloses an anomaly detector for detecting an anomaly in a sequence of poses of a human performing an activity. The anomaly detector includes an input interface, a memory, a processor and an output interface. The input interface is configured to accept input data indicative of a distribution of the sequence of poses. The memory is configured to store a discriminative one-class classifier having a pair of complementary classifiers bounding normal distribution of pose sequences in a reproducing kernel Hilbert space (RKHS). The processor is configured to embed the input data into an element of the RKHS and classify the embedded data using the discriminative one-class classifier. The output interface is configured to render a classification result.

Another embodiment discloses a method for detecting an anomaly in a sequence of poses of a human performing an activity. The method includes accepting input data indicative of a distribution of the sequence of poses. The method includes embedding the input data into an element of a reproducing kernel Hilbert space (RKHS). The method includes classifying the embedded data using a discriminative one-class classifier. The discriminative one-classifier includes a pair of complementary classifiers bounding normal distribution of pose sequences in the RKHS. The method further includes rendering a classification result.

Further features and advantages will become more readily apparent from the following detailed description when taken in conjunction with the accompanying drawings.

BRIEF DESCRIPTION OF THE DRAWINGS

The present disclosure is further described in the detailed description which follows, in reference to the noted plurality of drawings by way of non-limiting examples of exemplary embodiments of the present disclosure, in which like reference numerals represent similar parts throughout the several views of the drawings. The drawings shown are not necessarily to scale, with emphasis instead generally being placed upon illustrating the principles of the presently disclosed embodiments.

FIG. 3B shows a graphical representation depicting a pair of complementary classifiers of the discriminative one-class classifier, according to some other example embodiments of the present disclosure.

FIG. 12 shows an overall block diagram of the anomaly detector, according to some example embodiments of the present disclosure.

Figure 1:
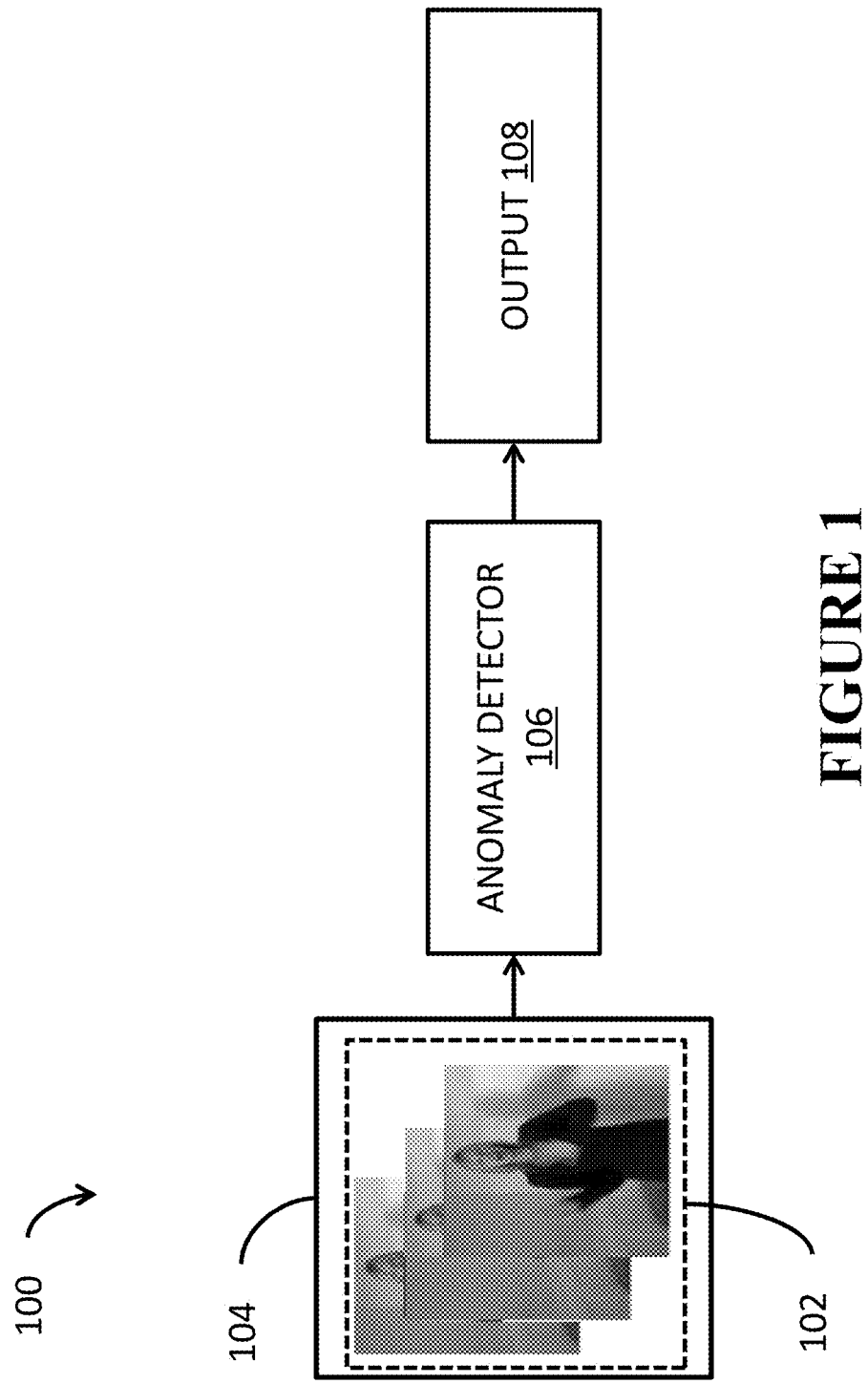
FIG. 1 shows a schematic diagram depicting anomaly detection in a sequence of poses using an anomaly detector, according to some embodiments of the present disclosure.

While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art which fall within the scope and spirit of the principles of the presently disclosed embodiments.

DETAILED DESCRIPTION

In the following description, for purposes of explanation, numerous specific details are set forth in order to provide a thorough understanding of the present disclosure. It will be apparent, however, to one skilled in the art that the present disclosure may be practiced without these specific details. In other instances, apparatuses and methods are shown in block diagram form only in order to avoid obscuring the present disclosure.

As used in this specification and claims, the terms "for example," "for instance," and "such as," and the verbs "comprising," "having," "including," and their other verb forms, when used in conjunction with a listing of one or more components or other items, are each to be construed as open ended, meaning that the listing is not to be considered as excluding other, additional components or items. The term "based on" means at least partially based on. Further, it is to be understood that the phraseology and terminology employed herein are for the purpose of the description and should not be regarded as limiting. Any heading utilized within this description is for convenience only and has no legal or limiting effect.

Overview

The proposed anomaly detector enables detection of anomaly in human poses. The human poses may constitute complex and non-linear data due to variance in the human poses. To that end, it is an objective of the anomaly detector to detect the anomaly in the human poses from a distribution of a sequence of poses. In some embodiments, the anomaly is classified from normal data, where the normal data corresponds to a normal (viz. non-anomalous one-class) distribution of pose sequences based on a classifier, such as a discriminative one-class classifier. The discriminative one-class classifier includes a pair of complementary classifiers that bound the normal distribution of pose sequences in a reproducible kernel Hilbert space. To that end, the pair of complementary classifiers may be optimized where distance between the pair of complementary classifiers is minimized and margin of each of the pair of complementary classifiers from the normal data is maximized. The optimization of the pair of complementary classifiers enables bounding the normal distribution of pose sequences from different directions, in an accurate and compact manner. Consequently, the discriminative one-class classifier detects outliers from the bounded normal distribution of pose sequences as anomaly in the human poses. The anomaly detection in the human poses may be implemented in different applications, such as vehicle driver assistance system, security surveillance system, and/or the like.

FIG. 1 shows a schematic diagram 100 depicting anomaly detection in a sequence of poses 102 using an anomaly detector 106, according to some embodiments of the present disclosure. In an example embodiment, the sequence of poses 102 may correspond to a set of image frames 104 of a human performing an activity. The set of image frames 104 may be obtained from an image capturing device, e.g., a video camera (not shown in FIG. 1). The sequence of poses 102 may include different human poses of a person, which may be complex and non-linear type of data. Moreover, some poses in the sequence of poses 102 may correspond to normal poses. The normal poses may include normal data of the sequence of poses 102. In some embodiments, these normal data of the normal poses may be used for classifying outliers in the sequence of poses 102 as anomaly data. The anomaly data may correspond to anomaly poses in the sequences of poses 102. Thus, these normal data and anomaly data in the sequence of poses 102 may be discriminated. To that end, the normal data and anomaly data may be discriminated using arbitrarily shaped boundaries of discriminative classes. However, the complexity and non-linearity in the sequence of poses 102 may impact the arbitrarily shaped boundaries of discriminative classifiers.

To that end, the sequence of poses 102 is provided to the anomaly detector 106 for anomaly detection in the sequence of poses 102. In some embodiments, a distribution of the sequence of poses 102 is provided as an input data to the anomaly detector 106 to produce an anomaly pose in the sequence of poses 102 as an output 108. The anomaly detector 106 is further described next with reference to FIG. 2.

Figure 2:
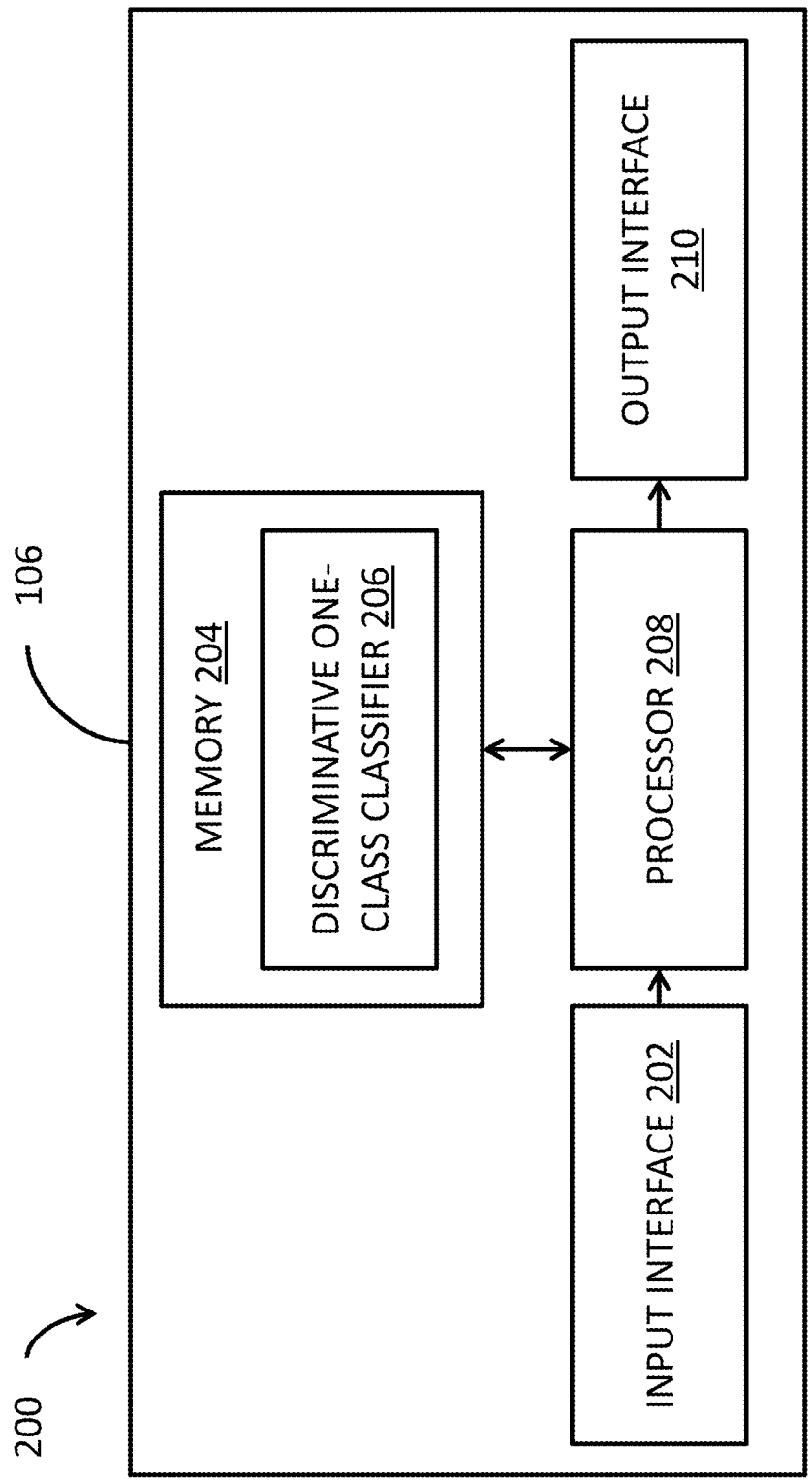
FIG. 2 shows a block diagram of the anomaly detector, according to some embodiments of the present disclosure.

FIG. 2 shows a block diagram of the anomaly detector 106, according to some embodiments of the present disclosure. The anomaly detector 106 includes an input interface 202, a memory 204, a processor 208, and an output interface 210. The input interface 202 is configured to accept an input data. The input data is indicative of a distribution of a sequence of poses, e.g., the sequence of poses 102 of FIG. 1. The memory 204 is configured to store a discriminative one-class classifier 206. The discriminative one-class classifier 206 includes a pair of complementary classifiers for bounding a normal distribution of pose sequences in a reproducing kernel Hilbert space (RKHS). Alternatively, or additionally, the discriminative one-class classifier 206 may include multiple complementary classifiers for bounding the normal distribution of pose sequences. As used herein, the normal distribution of pose sequences corresponds to a distribution of normal pose sequences of poses of a human while performing an activity.

The processor 208 is configured to embed the input data into the RKHS. The input data is embedded into the RKHS due to complexity and non-linearity of the input data. To that end, the sequence of poses 102 may be embedded into kernels for projecting the normal distribution of pose sequences to the RKHS. The RKHS includes an infinite dimensional linear space that enables projection of the non-linear input data into a linear space. The infinite dimensional linear space of the RKHS allows better learning of the pair of complementary classifiers when compared against other lower dimensional spaces. For instance, the infinite dimensional linear space of the RKHS allows the pair of complementary classifiers to bound the non-linear input data from different directions. To that end, the RKHS may address the complexity and non-linearity of the input data. The pair of complementary classifiers may be non-linear to bound the non-linear input data. However, each boundary of the pair of complementary classifiers may be linear in the RKHS. In different embodiments, different kernels may be used depending on distribution of data to be classified. For example, in some embodiments, a histogram intersection kernel may be used for the distribution of poses that are captured by a histogram. Likewise, Chi-square kernel is used for histogram data, a linear or RBF kernel may be used for spherical data, and a tree-kernel may be used for hierarchically structured data.

In some embodiments, each of the pair of complementary classifiers in the discriminative one-class classifier 206 bounds normal data corresponding to the normal distribution of pose sequences (i.e., pose sequences of normal human poses) from different directions. For instance, one of the pair of complementary classifiers may classify the normal data to a positive half-space in the RKHS and other classifier in the pair of complementary classifiers may classify the normal data to a negative half-space in the RKHS. Thus, the normal data may be bounded from complementary directions using the pair of complementary classifiers. Some of the non-limiting examples of the complementary classifiers may include, but not limited to, a pair of straight-line segments (e.g., hyperplanes), a pair of orthonormal frames (e.g., rectilinear and orthogonal matrices), a pair of normal but non-orthogonal frames, and a pair of non-orthonormal matrices (e.g., hyperspheres), which are shown in FIGS. 3A, 3B and 3C.

Further, the processor 208 is configured to classify the embedded data using the discriminative one-class classifier 206. The classified embedded data may be provided to the output interface 210 to render a classification result. The classification result may correspond to a detected anomaly pose in the sequence of poses 102. In some example embodiments, the processor 208 is further configured to output a notification, to the human performing the activity, based on the detected anomaly. The notification may be provided to the human via the output interface 210.

Figure 3A:
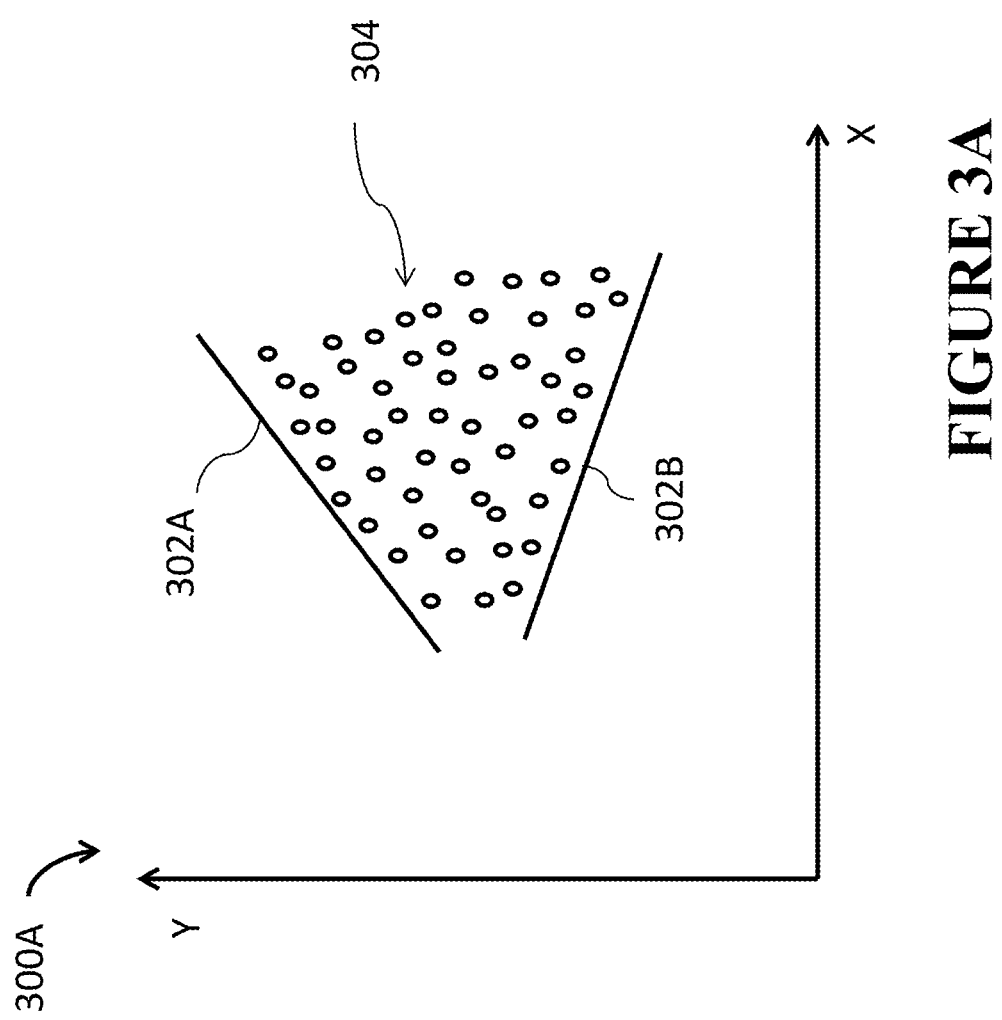
FIG. 3A shows a graphical representation depicting a pair of complementary classifiers of a discriminative one-class classifier, according to some example embodiments of the present disclosure.
Figure 3C:
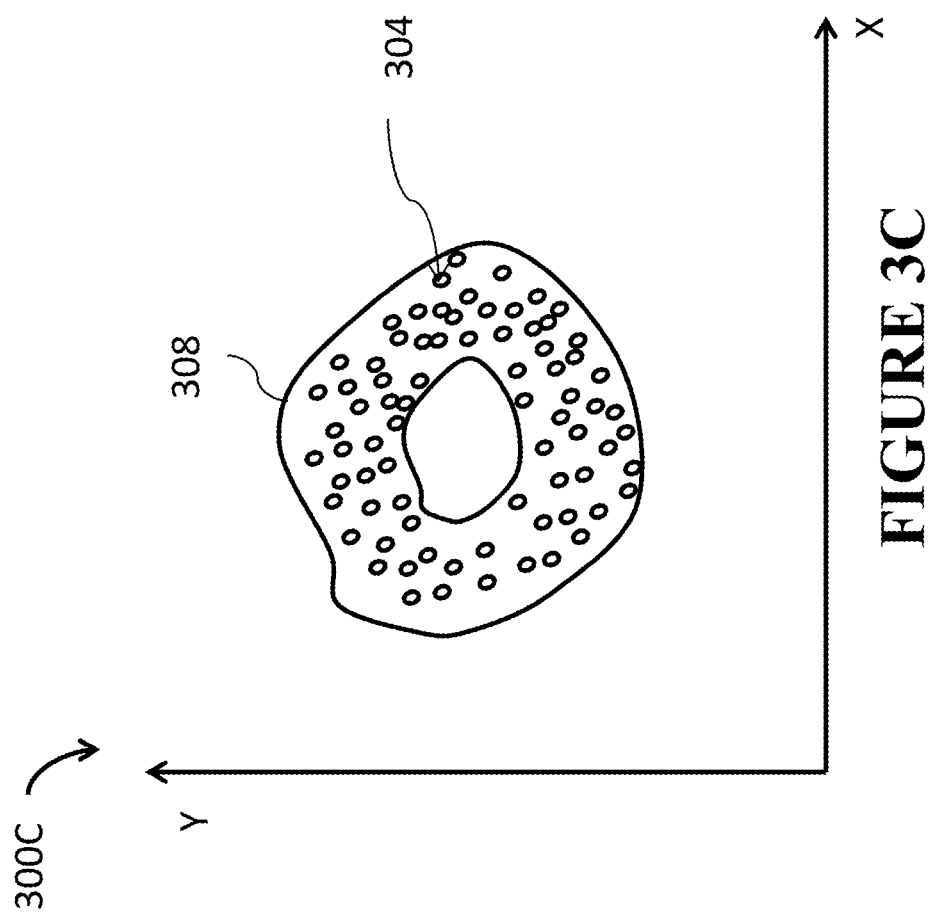
FIG. 3C shows a graphical representation depicting a pair of complementary classifiers of the discriminative one-class classifier, according to yet some another example embodiments of the present disclosure.

FIG. 3A shows a graphical representation 300A depicting a pair of complementary classifiers, according to some example embodiments of the present disclosure. In some example embodiments, the pair of complementary classifiers corresponds to a pair of hyperplanes 302A and 302B, as shown in FIG. 3A. Each of the pair of hyperplanes 302A and 302B may include a two-dimensional (2D) plane or a straight-line. As shown in FIG. 3A, the pair of hyperplanes 302A and 302B may bound a normal distribution of pose sequences 304. The normal distribution of pose sequences 304 correspond to normal pose sequences in the sequence of poses 102.

FIG. 3B shows a graphical representation 300B depicting a pair of complementary classifiers, according to some other example embodiments of the present disclosure. In some example embodiments, the pair of complementary classifiers of the discriminative one-class classifier 206 may correspond to a pair of orthonormal frames 306A and 306B, as shown in FIG. 3B. Each of the pair of orthonormal frames 306A and 306B may include two or more rectilinear hyperplanes, which are orthogonal to each other. The two or more rectilinear hyperplanes are grouped to form each of the pair of orthonormal frames 306A and 306B, while providing a piecewise linear boundary for bounding the normal distribution of pose sequences 304. The piecewise linear boundary also enables the pair of orthogonal frames 306A and 306B to perform in an efficient manner, while inferring classification of anomaly data from normal data in the normalized distribution of pose sequences 304.

In some cases, the normal distribution of pose sequences 304 may be distributed in a spherical manner. In such cases, the pair of orthonormal frames 306A and 306B or the pair of hyperplanes 302A and 302B may not bound one or more data points in the normal distribution of pose sequences 304 due to spherical shape or ring-shape. To that end, the spherical distribution of the normal distribution of pose sequences 304 may be bounded by a pair of hyperspheres, which is shown in FIG. 3C.

FIG. 3C shows a graphical representation 300C depicting a pair of complementary classifiers, according to yet some other example embodiments of the present disclosure. In some example embodiments, the pair of complementary classifiers of the discriminative one-class classifier 206 may correspond to a pair of hyperspheres 308A and 308B that bounds the normal distribution of pose sequences 304 in spherical shape within a spherical region.

Thus, the discriminative one-class classifier 206 bounds the normal distribution of pose sequences 304 in different shapes of distribution within boundary of the pair of complementary classifiers (such as the pair of hyperplanes 302A and 302B, the pair of orthonormal frames 306A and 306B and the pair of hyperspheres 308A and 308B). To that end, the discriminative one-class classifier 206 is trained for bounding the normal distribution of pose sequences 304, which is described next with reference to FIG. 4.

Figure 4:
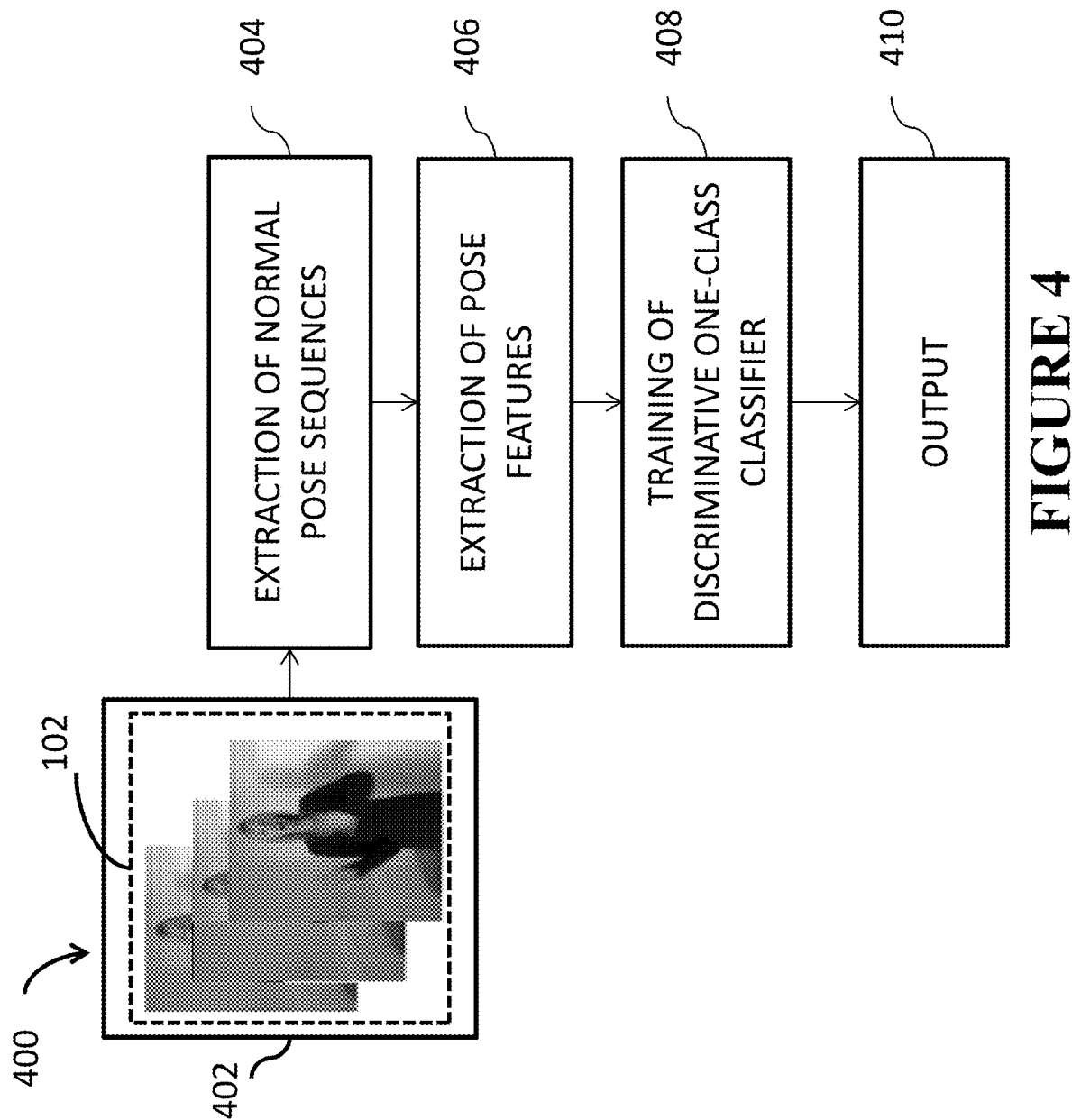
FIG. 4 shows a pipeline depicting training of the discriminative one-class classifier, according to some embodiments of the present disclosure.

FIG. 4 shows a pipeline 400 depicting training of the discriminative one-class classifier 206, according to some embodiments of the present disclosure. The pipeline 400 starts at step 402. At step 402, the sequence of poses 102 is provided as input to the discriminative one-class classifier 206. The sequence of poses 102 may correspond to normal human poses. For instance, the sequence of poses 102 may correspond to a pre-defined dataset of normal human poses. At step 404, the sequence of poses 102 is pre-processed to extract normal pose sequences. The extracted normal pose sequences are provided to a classification model of the discriminative one-class classifier 206.

At step 406, pose features are extracted from the extracted normal pose sequences based on the classification model. In some example embodiments, the classification model may include a bag-of-word (BoW) model, a convolution neural network (CNN) model, a deep-learning model and/or the like. In some example embodiments, the BoW model may be trained to embed the extracted pose sequences into a fixed dimension histogram vector for the extraction of the pose features. In some other example embodiments, the CNN model may be trained an auto-encoder to encode the extracted pose sequences into a vector for the extraction of the pose features. In some cases, the CNN model may be trained on dataset corresponding to skeleton-based human poses for the extraction of the pose features. Such cases of training the CNN model may happen in an application, e.g., skeleton-based action recognition.

At step 408, the discriminative one-class classifier 206 is trained based on the extracted pose features. To that end, the extracted pose features are provided to the pair of complementary classifiers (e.g., the pair of hyperplanes 302A and 302B, the pair of orthonormal frames 304A and 304B and the pair of hyperplanes 306A and 306B) to learn a model of distribution of normalized pose sequences (e.g., the normalized pose sequences 304). This enables the discriminative one-class classifier 206 to estimate data density of the normalized distribution of pose sequences 304.

In some embodiments, the discriminative one-class classifier 206 may estimate the data density of the normal distribution of pose sequences based on a min-max optimization technique. The min-max optimization technique is utilized to minimize distance between each classifier of the pair of complementary classifiers, and maximize boundary of each classifier of the pair of complementary classifiers for maximum encapsulation of the normal distribution of pose sequences. In some example embodiments, the min-max optimization technique corresponds to Riemannian conjugate gradient algorithms.

To that end, it is objective of some embodiments to train parameters of the pair of complementary classifiers. For instance, corresponding parameter of each of the pair of hyperplanes 302A and 302A may be trained for estimating the data density corresponding to the normal distribution of pose sequences. Each of the parameters of the pair of hyperplanes 302A and 302B may be denoted by $(w_1, b_1)$ and $(w_2, b_2)$ and the normal distribution of pose sequences 304 may be denoted by data points $x_i$.

In some example embodiments, the parameters $(w_1, b_1)$ and $(w_2, b_2)$ may be trained by solving the following equations (1), (2), (3), and (4).

$$\min_{\substack{(w_1,b_1),(w_2,b_2),\\ \xi_1,\xi_2,\beta>0}} \frac{1}{2}\|w_1\|_2^2 + \frac{1}{2}\|w_2\|_2^2 - b_1 - b_2 + \Omega(\xi_{1i}, \xi_{2i}) \quad \text{Equation (1)}$$

$$\text{s.t.} (w_1^T x_i + b_1) \geq \eta - \xi_{1i} \quad \text{Equation (2)}$$

$$(w_2^T x_i + b_2) \leq -\eta + \xi_{2i} \quad \text{Equation (3)}$$

$$dist^2((w_1, b_1), (w_2, b_2)) \leq \beta, \forall\, i = 1, 2, \ldots, n, \quad \text{Equation (4)}$$

Equation (2) constraints the data points $x_i$ of the normal distribution of pose sequences 304 such that the data points $x_i$ belong to a positive half-space of $(w_1, b_1)$ (e.g., the hyperplane 302A). Likewise, Equation (3) constraints the data points $x_i$ to a negative half-space of $(w_2, b_2)$ (e.g., the hyperplane 302B). The notation $\Omega(\xi_{1i}, \xi_{2i}) = C\Sigma_{i=1}^{n}(\xi_{1i}+\xi_{2i})$ is used for slack regulation and $\eta > 0$ specifies a classification boundary for each of the pair of the hyperplanes 302A and 302B.

Further, the parameters $(w_1, b_1)$ and $(w_2, b_2)$ may be constrained by Equation (4), which aims to minimize distance between the two hyperplanes 302A and 302B by $\beta$. For instance, the distance between the two hyperplanes 302A and 302B correspond to a Euclidean distance that may be represented by $$\text{dist}^2((w_1,b_1),(w_2,b_2)) = \|w_1-w_2\|_2^2 + (b_1-b_2)^2$$

Here, $w_i$ denotes weights that may be unconstrained for one-class classification, e.g., classification of data based on the discriminative one-class classifier 206. This may lead to overfitting of the data points x. To that end, in some embodiments, the weights $w_i$'s may be regularized to a unit norm or a unit vector, i.e. $\|w_1\|_2 = \|w_2\|_2 = 1$. Also, weights $w_1$ and $w_2$ may belong to a unit hypersphere $U^{d-1}$, which may be sub-manifold of the Euclidean manifold $\mathbb{R}^d$.

Using the sub-manifold of the Euclidean manifold $\mathbb{R}^d$ constraints, the optimization of equation (1) may be mathematically represented as below:

$$P_1 := \min_{\substack{w_1,w_2 \in U^{d-1} \\ \xi_1,\xi_2 \geq 0, b_1, b_2}} \alpha(b_1, b_2) - 2w_1^T w_2 + \Omega(\xi_{1i}, \xi_{2i}) + \quad \text{Equation (5)}$$

$$\frac{v}{2n}\sum_i [\eta - (w_1^T x_i + b_1) - \xi_{1i}]_+^2 + [\eta + (w_2^T x_i + b_2) - \xi_{2i}]_+^2$$

where using the unit-norm constraints $\text{dist}^2$ simplifies to $-2w_1^T w_2 + (b_1-b_2)^2$, and $\alpha(b_1, b_2) = (b_1-b_2)^2 - b_1 - b_2$. The notation $[\,]_+$ represents hinge loss, and $v$ represents a penalty factor on the unit-norm constraints.

In a similar manner, for the pair of orthonormal frames 306A and 306B, subspace frames $(W_1$ and $W_2)$ of the corresponding orthonormal frames 306A and 306B may be trained for estimating density of the data points $x_i$. For instance, $W_1, W_2 \in S_d^K$ be the subspace frames belonging to a set of all orthonormal k-frames, such as Stiefel manifold, denoted by $S_d^K$, with K d-dimensional subspaces. The subspace frames $W_1$ and $W_2$ may be matrices of dimensions $d \times K$. Each of the matrices may include K columns where each column of a matrix is orthonormal to rest of column in other matrix; i.e. $W_1^T W_1 = W_2^T W_2 = I_K$, where $I_K$ is an identity matrix. The orthogonality assumptions on the $W_i$'s ensures that each of the subspace frames $W_1$ and $W_2$ captures diverse discriminative directions, leading to better regularization of the data points. Further, the orthogonality of the subspace frames of the two orthonormal frames 306A and 306B also improve characterization of distribution of the data points. A direct extension of $P_1$ leads to:

$$P_2 := \min_{W \in S_d^K, \xi \geq 0, b} \frac{1}{2}\text{dist}_W^2(W_1, W_2) + \quad \text{Equation (6)}$$

$$\alpha(b_1, b_2) + \Omega(\xi_{1i}, \xi_{2i}) + \quad \text{Equation (7)}$$

$$\frac{v}{2n}\sum_i [\eta - \min(W_1^T x_i + b_1) - \xi_{1i}]_+^2 + \quad \text{Equation (8)}$$

$$\frac{v}{2n}\sum_i [\eta + \max(W_2^T x_i + b_2) - \xi_{2i}]_+^2 \quad \text{Equation (9)}$$

where $\text{dist}_w$ is a distance between the orthonormal frames 306A and 306A, and $b \in \mathbb{R}^K$ is a vector of biases. In equations (8) and (9), the notation $W^T x_i + b$ is a K-dimensional vector. Thus, equation (8) indicates that minimum value of $(W_1^T x_i + b_1)$ should be greater than a classification boundary $(\eta)$ of each of the orthonormal frames 306A and 306B and equation (9) indicates that maximum value of $(W_2^T x_i + b_2)$ should be less than $-\eta$. For sake of simplification, $\varsigma(W, b, \xi) = \alpha(b_1, b_2) + \Omega(\xi_{1i}, \xi_{2i}) + $ equation (8) + equation (9), is used for rewriting equation (6), $P_2$ as:

$$P_2' := \min_{W \in S_d^K, \xi \geq 0, b} -Tr(W_1^T W_2 \Delta) + \varsigma(W, b, \xi) \quad \text{Equation (10)}$$

The formulation of $P'_2$, due to the term $-Tr(W_1^T W_2 \Delta)$, enforces a coupling between the subspace frames and $W_2$ $$P_2'' := \min_{\substack{\Pi \in P_K, W \in S_d^{K,2} \\ \xi \geq 0, b}} \frac{1}{2}\text{dist}_W^2(W_1, W_2\Pi)^2 + \varsigma(W, b, \xi) \quad \text{Equation (11)}$$

where $\Pi$ is a $K \times K$ permutation matrix, belonging to the set of orthonormal matrices $P_K$ defined as $P_K := \{\pi \in \mathbb{B}^{K \times K} | \pi^T \pi = I_K, \pi^T 1 = 1, 1^T \pi = 1\}$, where $\mathbb{B}$ denotes a space of binary numbers, and 1 is a vector of ones. For sake of simplification, assuming $\Pi$ to be a doubly-stochastic matrix $\Delta \in \delta_K := \{Z \in \mathbb{R}^{K \times K} | Z \succ 0, Z^T 1 = 1, 1^T Z = 1\}$, the set of all $K \times K$ positive definite matrices. The set of permutation matrices forms a corner of the $\delta_K$. Based on this assumption, equation (10) is mathematically rewritten as in equation (12).

$$P_2'' := \min_{\substack{\Delta \in \delta_K, W \in S_d^K, \\ \xi \geq 0, b}} -Tr(W_1^T W_2 \Delta) + \varsigma(W, b, \xi) \quad \text{Equation (12)}$$

In equation (12) including the optimization on the distance between the orthonormal frames 304A and 304B to find the alignment between the subspaces frames $W_1$ and $W_2$ may be computationally challenging. To that end, some embodiments uses a measure that minimizes the Euclidean distance of each data point $x_i$ from both the subspaces frames $W_1$ and $W_2$. The minimization of the Euclidean distance of each input data point ensures the distance between the subspaces frames $W_1$ and $W_2$ bounds entire data points $x_i$. To that end, the notation $\text{dist}_w^2$ is mathematically rewritten as shown below.

$$\text{dist}_w^2(W_1, W_2, b_1, b_2 | X) = \frac{1}{2}\Sigma_{j=1}^2 \|W_j^T X + b_j\|_2^2 \quad \text{Equation (13)}$$

In some embodiments, sum of lengths of each data point x is minimized after embedding on to respective subspace frames (e.g., the orthonormal frames 306A and 306B). This enables the orthonormal frames 306A and 306B to be closer to each other to optimally bound the data points.

Further, using equation (13), the discriminative one-class classifier 206 may be mathematically represented as shown below:

$$\min_{\substack{W \in S_d^K \\ \xi \geq 0, b}} F = \frac{1}{2n}\sum_{i=1}^{n}\sum_{j=1}^{2}\|W_j^T x_i + b_j\|_2^2 + \alpha(b_1, b_2) + \quad \text{Equtaion (14)}$$

$$\Omega(\xi_{1i}, \xi_{2i}) + \frac{v}{2n}\sum_{i}[\eta - \min(W_1^T x_i + b_1) - \xi_{1i}]_+^2 +$$

$$\frac{v}{2n}\sum_{i}[\eta + \max(W_2^T x_i + b_2) - \xi_{2i}]_+^2$$

Some embodiments are based on the recognition that the orthogonality constraints on the subspace frames $W_1$ and $W_2$ impose a non-convex optimization problem on equation (14). To that end, some embodiments address the non-convex optimization problem using the Riemannian conjugate gradient optimization technique.

For sake of explanation, assuming F(W) as a function with W representing a curved Riemannian manifold, the Riemannian gradient is mathematically represented as below:

$$\text{grad} F(W) = \nabla_w F(W) - W\nabla_w F(W)^T W$$

where, $\nabla_w F(W)$ is a Euclidean gradient of F, which is mathematically represented as below.

$$\frac{\partial F}{\partial W_1} = \sum_{i=1}^{n} x_i(W_1^T x_i + b_1)^T - Z_{k_i^*}[\eta - W_{1,k_i^*}^T x_i - b_1 - \xi_{1i}]_+ \quad \text{Equation (15)}$$

$$\frac{\partial F}{\partial W_2} = \sum_{i=1}^{n} x_i(W_2^T x_i + b_2)^T - Z_{k_i^*}[\eta + W_{2,k_i^*}^T x_i + b_2 - \xi_{2i}]_+ \quad \text{Equation (16)}$$

where $k_i^* \in [K]$ denotes an index of rectilinear hyperplane for the respective subspace frames $W_1$ and $W_2$; $k_i^* = \arg\min_k(W_1^T x_i + b_1)$ for equation (15) and $k_i^* = \arg\max_k(W_2^T x_i + b_2)$ for equation (16). The variable $Z_{k_i^*}$ is a d×K matrix with all zeros, except $k_i^*$-th column, which is set to $x_i$.

In some example embodiments, the pair of hyperspheres 308A and 308B may be trained for estimating the data density corresponding to the normal distribution of pose sequences based on solving the equations (6), (7), (8), (9), and (10). Mathematically, the pair of hyperspheres 308A and 308B may be represented as below:

$$\min_{\substack{W \in S_d^K, b}} \frac{1}{2}\|W_1 - W_2\|_F^2 + \frac{1}{2}\|b_1 - b_2\|_2^2 \quad \text{Equation (17)}$$

$$\text{s.t.} \quad \eta - (W_{1,j}^T x_i + b_1) \leq 0, \forall j \in [K], i \in [n]$$

$$\eta + (W_{2,j}^T x_i + b_2) \leq 0, \forall j \in [K], i \in [n]$$

Using the fact that $W^T W = I_K$, and using non-negative dual variables $Y, Z \in \mathbb{R}^{K \times n}$, equation (18) is mathematically represented as below.

$$L(W,b,Y,Z) := -Tr(W_1^T W_2) + \frac{1}{2}\|b_1 - b_2\|_2^2 + Tr(Y^T(\eta 1_{K \times n} - W_1^T X - b_1 1_n^T)) + Tr(Z^T(W_2^T X + b_2 1_n^T + \eta 1_{K \times n})) \quad \text{Equation (18)}$$

After simplifying equation (18), the pair of hyperspheres 308A and 308B is mathematically represented as below.

$$\min_{Y,Z \in \mathbb{R}_+^{K \times n}} \frac{1}{2} 1_n^T Y^T Y 1_n + Tr(Y\mathbb{K}Z^T) - \eta Tr((Y+Z^T)1_{K \times n}) \quad \text{Equation (19)}$$

$$\text{s.t.} (Y - Z)1_n = 0$$

$$Y\mathbb{K}Y^T = Z\mathbb{K}Z^T = I_K \quad \text{Equation (20)}$$

where $\mathbb{K} = X^T X$ is a linear kernel. The linear kernel may be replaced by any other positive definite kernel via a kernel trick, i.e., embedding data points into kernels.

Further, an approximation of the pair of hyperspheres 308A and 308B is mathematically represented as below.

$$\min_{Y,Z \in \mathcal{G}_{\mathbb{K}}^{K \times n}} K(Y, Z) = \frac{1}{2} 1_n^T (Y \odot Y)^T (Y \odot Y) 1_n + \quad \text{Equation (21)}$$

$$Tr((Y \odot Y)\mathbb{K}(Z \odot Z)^T) - \eta Tr(((Y \odot Y) + (Z \odot Z))^T 1_{K \times n}) +$$

$$\frac{\lambda}{2}\|((Y \odot Y)) - ((Z \odot Z))1\|_2^2$$

where the generalized Stiefel manifold is defined as, $$\mathcal{G}_{\mathbb{K}}^{K \times n} = \{Y \in \mathbb{R}^{K \times n} : Y\mathbb{K}Y^T = I_K, \mathbb{K} \succ 0\}.$$

The mathematical relationship between the primal variables and dual variables are as shown below.

$$W_1(.) = (Z \odot Z)\mathbb{K}(X,.)$$

$$W_2(.) = -(Y \odot Y)\mathbb{K}(X,.)$$

$$b_1 = \text{row max}(\eta - (Z \odot Z)\mathbb{K})$$

$$b_2 = \text{row min}(-\eta + (Y \odot Y)\mathbb{K}),$$

Where, rowmax corresponds to maximum values and rowmin corresponds to minimum values along the rows of the respective matrices.

Thus, the trained discriminative one-class classifier 206 provides the model of distribution of normalized pose sequences 304 as an output, at step 410.

The trained discriminative one-class classifier 206 is used by the anomaly detector 106 for the anomaly detection in human poses, which is described next with reference to FIG. 5.

Figure 5:
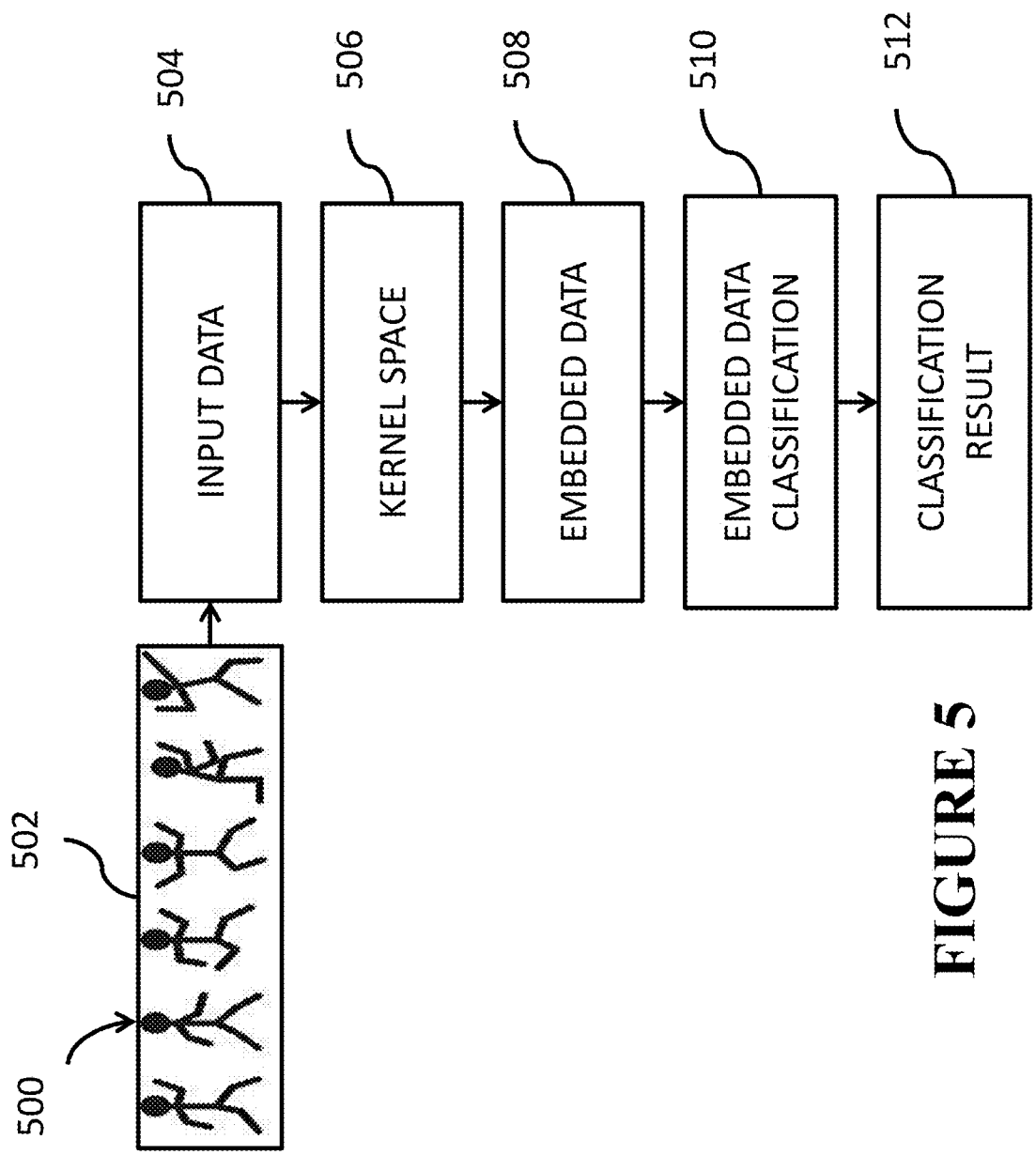
FIG. 5 shows a pipeline depicting detection of anomaly in human poses by the anomaly detector based on the trained discriminative one-class classifier, according to some example embodiments of the present disclosure.

FIG. 5 shows a pipeline 500 depicting detection of anomaly in human poses by the anomaly detector 106 based on the trained discriminative one-class classifier 206, according to some example embodiments of the present disclosure. The pipeline 500 is executed by the processor 208 of the anomaly detector 106 and the pipeline 500 starts at step 502.

At step 502, a sequence of poses, e.g. the sequence of poses 102 is provided to the anomaly detector 106. In an example embodiment, the sequence of poses 102 may include normal poses as well as anomaly poses of a human while performing an activity. The sequence of poses 102 that includes the normal and anomaly poses may be obtained from a real-time video or a pre-recorded video captured by an image capturing device, such as camera, a video recorder, an in-depth sensor camera, and/or the like.

At step 504, the sequence of poses 102 is accepted as an input data, via the input interface 202 of the anomaly detector 106. The input data is indicative of a distribution of sequence of poses 102.

At step 506, the input data is embedded into a kernel space, e.g., the reproducing kernel Hilbert space (RKHS). The input data is embedded into the RKHS for learning the pair of complementary classifiers. For example, the pair of complementary classifiers may be learnt better to bind the normal data from different directions in a high-dimensional space such as the RKHS rather than a low-dimensional space. In some embodiments, the embedding of the input data into the RHKS may be pre-trained, using neural networks. For instance, data points y of the input data may be embedded into the RKHS based on trained data points (e.g. the data points x) or pre-defined kernel. If k(x, .) is a kernel map for the data points x and if a linear hyperplane in the kernel space has the form $\Sigma x_i w_i k(x_i, .)$ (where $w_i$ is a weight assigned to each data point $x_i$), then the kernel embedding may be pre-trained to embed a data point $y_i$ into the kernel space $\Sigma x_i w_i k(x_i, y_i)$.

At step 508, embedded data is obtained based on the kernel embedding of the input data into the RKHS.

At step 510, the embedded data is classified using the trained discriminative one-class classifier 206. In an example embodiment, the embedded data is classified based on the learned parameters of the pair of complementary classifiers. The pair of complementary classifiers may bound data points corresponding to the normal poses into an in-class data from data points corresponding to the anomaly poses. The data points corresponding to the anomaly poses may be represented as an out-of-class data.

In some example embodiments, data point $y_i$ may be classified as the in-class data point if the following condition is met:

$$\min(W_1(x)+b_1) \geq \eta \land \max(W_2(x)+b_2) \leq -\eta,$$

where the variables W and b are the learned parameters of the pair of complementary classifiers of the discriminative one-class classifier 206.

At step 510, the classified embedded data is rendered as a classification result via the output interface 210. A representation of the classification result is shown in FIG. 6.

Figure 6:
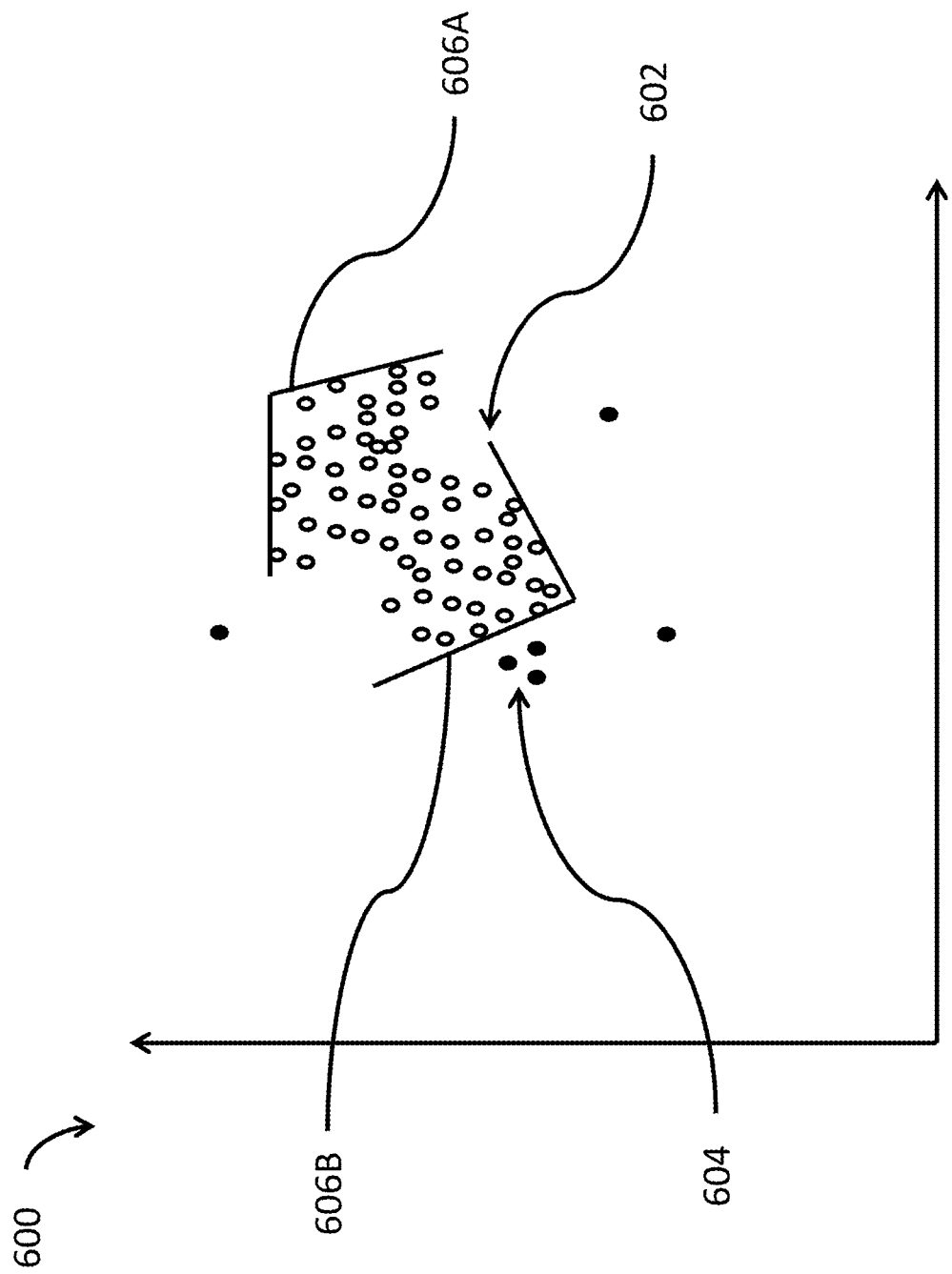
FIG. 6 shows a graphical representation depicting classification result corresponding to a detected anomaly in the sequence of poses, according to some example embodiments.

FIG. 6 shows a graphical representation 600 depicting a classification result corresponding to a detected anomaly in the sequence of poses 102, according to some example embodiments. In the graphical representation 600, data points 602 is within a region bounded by a pair of the orthonormal frames 606A and 606B represents an in-class data, i.e. normal poses in the sequence of poses 102 and data points 604 outside the region bounded by the pair of the orthonormal frames 606A and 606B represents an out-of-class data, i.e., anomaly poses in the sequence of poses 102.

In some embodiments, the anomaly detection in a sequence of poses, e.g., the sequences of poses 102 using the anomaly detector 106 may be implemented in a vehicle driver assistance system, which is described next with reference to FIG. 7.

Figure 7:
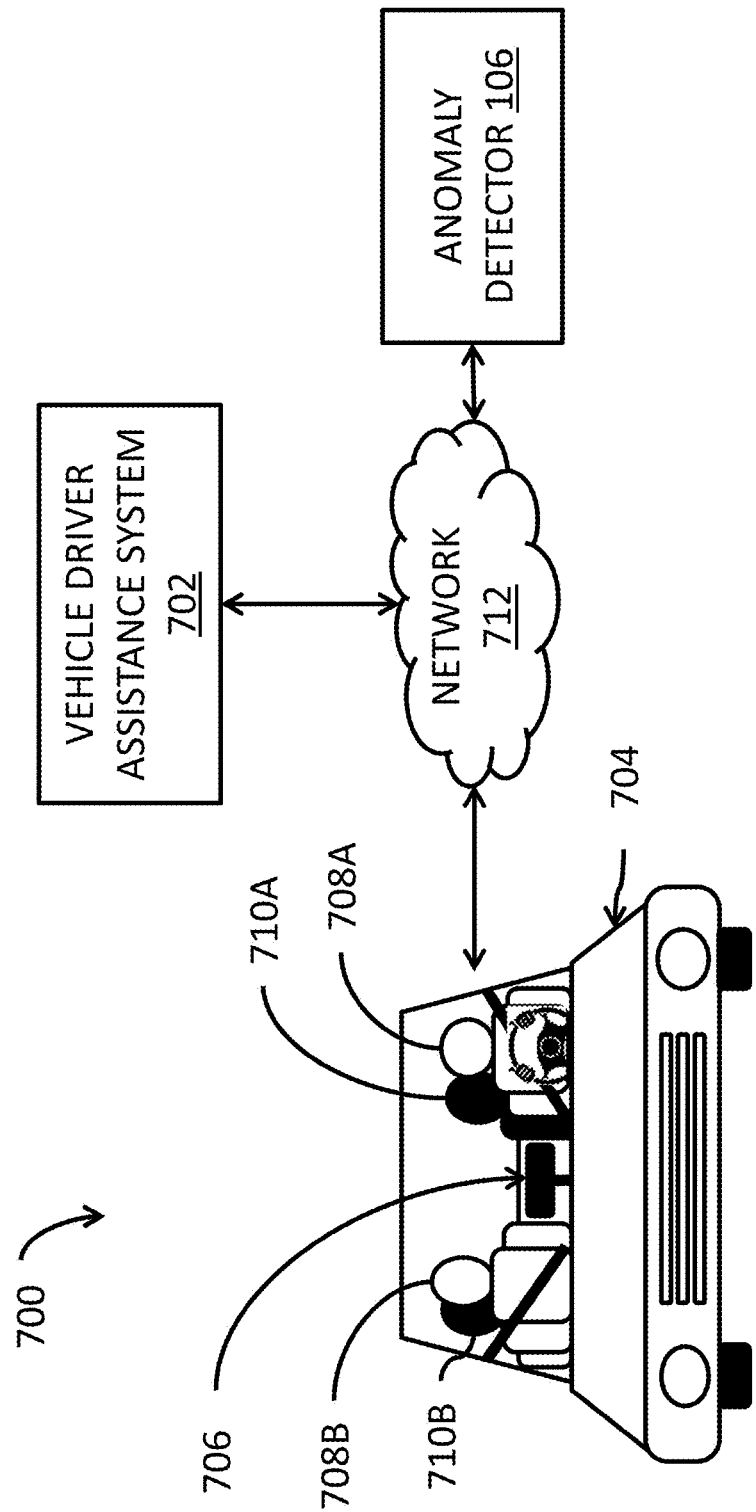
FIG. 7 shows an environmental representation depicting anomaly detection in vehicle driver assistance system using the anomaly detector, according to some example embodiments.

FIG. 7 shows an environmental representation 700 depicting anomaly detection in a vehicle driver assistance system 702 using the anomaly detector 106, according to some example embodiments. In an example embodiment, a vehicle 704 may be assisted by the vehicle driver assistance system 702. In some example embodiments, the vehicle driver assistance system 702 may be remotely connected to the vehicle 704, via a network 712. In some alternate embodiments, the vehicle driver assistance system 702 may be boarded on the vehicle 704. Further, the vehicle driver assistance system 702 may be connected to the anomaly detector 106 via the network 712. In some alternate example embodiments, the anomaly detector 106 may be embodied within the vehicle driver assistance system 702.

The vehicle 704 may include an autonomous vehicle, a semi-autonomous vehicle or a manually operated vehicle. In an illustrative example scenario, the vehicle 704 may be occupied by one or more occupants, e.g., an occupant 708A, an occupant 708B, an occupant 710A and an occupant 710B, as shown in FIG. 7. The vehicle 704 may be equipped with a camera 706, e.g. a dash-camera to capture a sequence of image frames with poses of the occupants 708A, 708B, 710A and 710B. The occupants 708A and 708B may be occupying front-seat of the vehicle 704 and the occupants 710A and 710B may be occupying back-seat of the vehicle 704. The camera 706 may be coupled to the vehicle driver assistance system 702 for providing the captured sequence of image frames with the poses of the occupants 708A, 708B, 710A and 710B.

In some cases, capture of the poses of all the occupants 708A, 708B, 710A and 710B by the camera 706 may not be feasible. For instance, poses of the occupants 710A and 710B in the back-seat captured by the camera 706 may be inaccurate due to factors such as occlusion, ambience in the back-seat, or the like. In such cases, the poses of the occupants 710A and 710B may be filtered or discarded and only poses of the occupants 708A and 708B may be considered for the anomaly detection.

In some other cases, the vehicle 704 may be equipped with multiple cameras in the vehicle 704 to capture poses of all the occupants 708A, 708B, 710A and 710B in the vehicle 704. For instance, another camera (not shown in FIG. 7) may be equipped in the vehicle 704 for capturing a set of image frames with poses of the occupants 710A and 710B in the back-seat of the vehicle. In this manner, the camera 706 may capture the poses of the occupants 708A and 708B in the front-seat and the other camera may capture the poses of the occupants 710A and 710B in the back-seat.

The camera 706 may send the captured sequence of image frames with the poses of the occupants 708A, 708B, 710A and 710B to the vehicle driver assistance system 702, which may further send to the anomaly detector 106. The poses of the occupants 708A, 708B, 710A and 710B may include sitting poses, driving poses, dancing poses, or the like.

The anomaly detector 106 detects anomaly poses in the poses of the occupants 708A, 708B, 710A and 710B, which is described next in FIG. 8.

Figure 8:
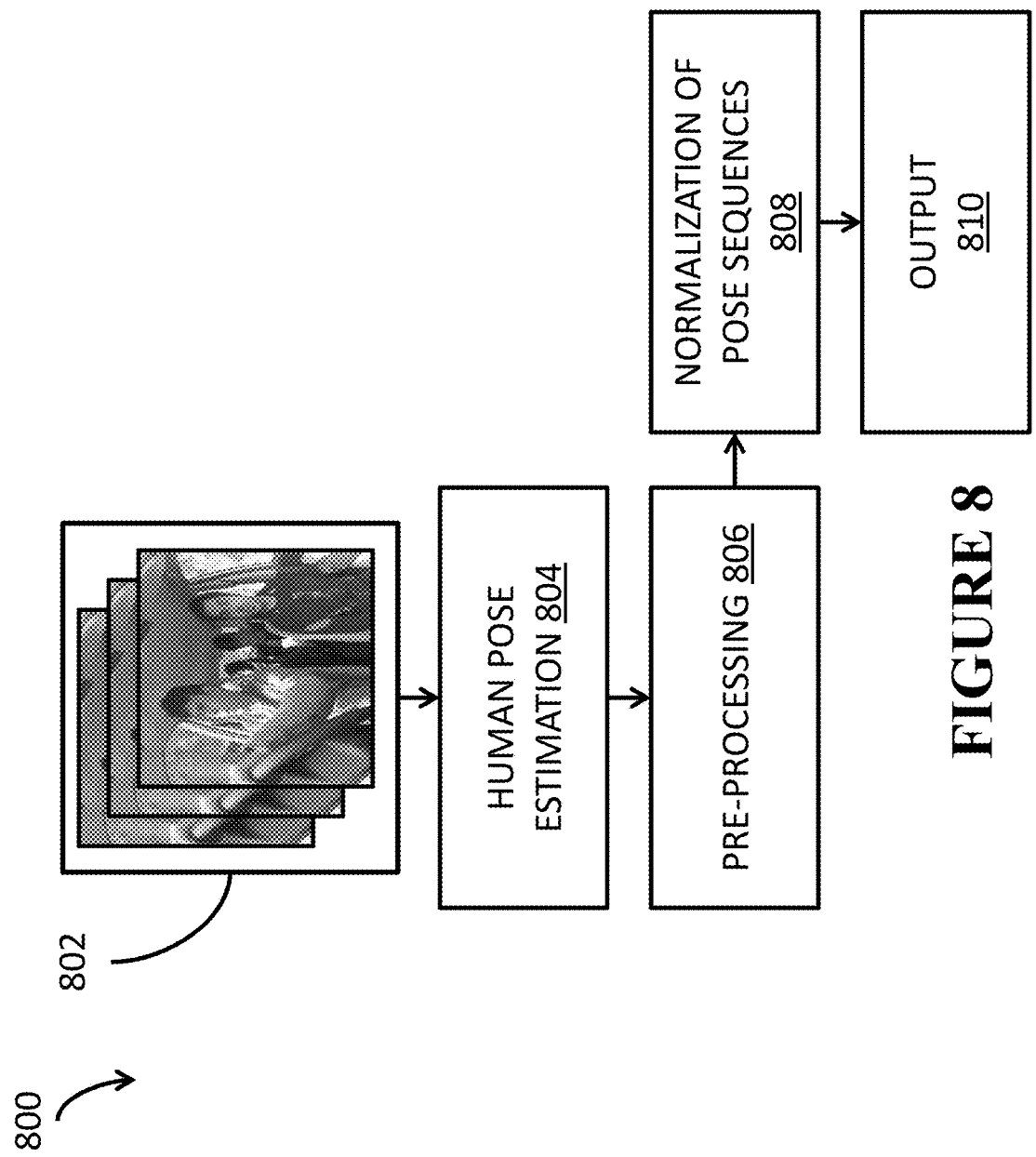
FIG. 8 shows a block diagram depicting detection of anomaly poses in a sequence of image frames by the anomaly detector, according to some example embodiments.

FIG. 8 shows a block diagram 800 depicting detection of anomaly poses in a sequence of image frames 802 by the anomaly detector 106, according to some example embodiments. In some example embodiments, the sequence of image frames 802 correspond to the sequence of image frames with the poses of the occupants 708A, 708B, 710A and 710B captured by the camera 706. The sequence of image frames 802 is provided as input to the anomaly detector 106.

At step 804, the anomaly detector 106 detects a pose in each of the sequence of image frames 802 based on one of pose estimation techniques. Some of the pose estimation techniques may include OpenPose, DeepCut pose estimation, Regional Multi-Person Pose Estimation (RMPE), Mask RCNN, and the like.

At step 806, the anomaly detector 106 filters a set of image frames with sequence of poses (e.g., the poses of the occupants 708A, 708B, 710A and 710B) from the sequence of image frames 802 based on the detected pose. In the filtering step, poses of one or more occupants, e.g., the occupants 710A and 710B that are affected by occlusion, ambience in the back-seat, or other factors, are filtered.

After filtering the set of images, the anomaly detector 106 performs pre-processing of the set of image frames, at step 806. In the pre-processing step 806, the anomaly detector 106 matches a pose in an image frame of the set of image frames to another pose in next image frame of the set of image frames that is spatially close to the pose in the image frame of the set of image frames. In some example embodiments, the pose of a current image frame may be matched to a pose in the next image frame based on a temporal sliding window. In some embodiments, the temporal sliding window may be pre-trained to generate pose sequences of fixed length. The temporal sliding window may be pre-trained based on a predefined dataset comprising image frames learnt from various video clips. For instance, the set of image frames may have a large number of image frames (e.g., 1000 image frames) out of which only some of the image frames may include actual poses of one or more occupants (e.g., the occupants 708A and 708B). These image frames with the actual poses may be generated into a fixed length (e.g., 500 image frames) based on the trained temporal sliding window. In some example embodiments, the temporal sliding window may include a pose bounding box for matching the poses from one image frame to next image frame. After the matched poses are determined, pose sequences exclusively for each occupant (e.g., the occupant 708A and the occupant 708B) in the vehicle 704 are generated.

At step 808, the anomaly detector 106 performs normalization on the generated pose sequences. To that end, the anomaly detector 106 prunes joints from the detected pose in each of the pose sequences. In some embodiments, the joints are pruned based on a detection score of corresponding joints in the detected pose below a pre-defined threshold. For example, the occupant 708B may be in a sitting pose with knees kept on a seat. Such sitting pose may have joints with a low detection score (e.g., 4), which may be below the pre-defined threshold (e.g., 10). The pose with the low detection score of the joints are pruned. In some example embodiments, each joint may be associated with a visibility flag. The visibility flag may indicate whether the joint is occluded or not. To that end, the anomaly detector 106 may also prune the joints based on the visibility flag of corresponding joints. In some example embodiments, the anomaly detector 106 may assign more weightage to the visibility flag of the joint than the detection score of the joint. To that end, the anomaly detector 106 may avoid a situation where pruning of a joint which is visible but having low detection score.

After pruning the joints with low detection score and/or the joints with the visibility flag indicating that the joints are occluded, joints in each of the pose sequences with detection score above the pre-defined threshold and/or joints with the visibility flag indicating that the joints are not occluded are normalized. In an example embodiment, the joints in each of the pose sequences may be normalized between [0,1] by dividing locations of each of the joints by size of an image frame in the sequence of image frames. The division of the locations is followed by subtraction of a neck joint from each joint location of each pose in the pose sequences. The neck joint represents an origin of each of the poses.

At step 810, the anomaly detector 106 generates the normalized pose sequences as an output.

In some embodiments, the anomaly detector 106 generates a vector representation for each pose in the normalized pose sequences. Each vector representation of each pose in the normalized pose sequences is embedded into a sequence representation of a pre-defined dimension using the discriminative one-class classifier 206. For instance, the vector representation may represent each pose as (x,y) location coordinates with a total of 2n dimensions, where n is number of all joints in the pose. In case of an occluded joint, corresponding location coordinate of the occluded joint may be assigned as 0. In some example embodiments, the sequence representation may correspond to normalized histogram. The normalized pose sequences and the normalized histogram are shown next with reference to FIG. 9.

Figure 9:
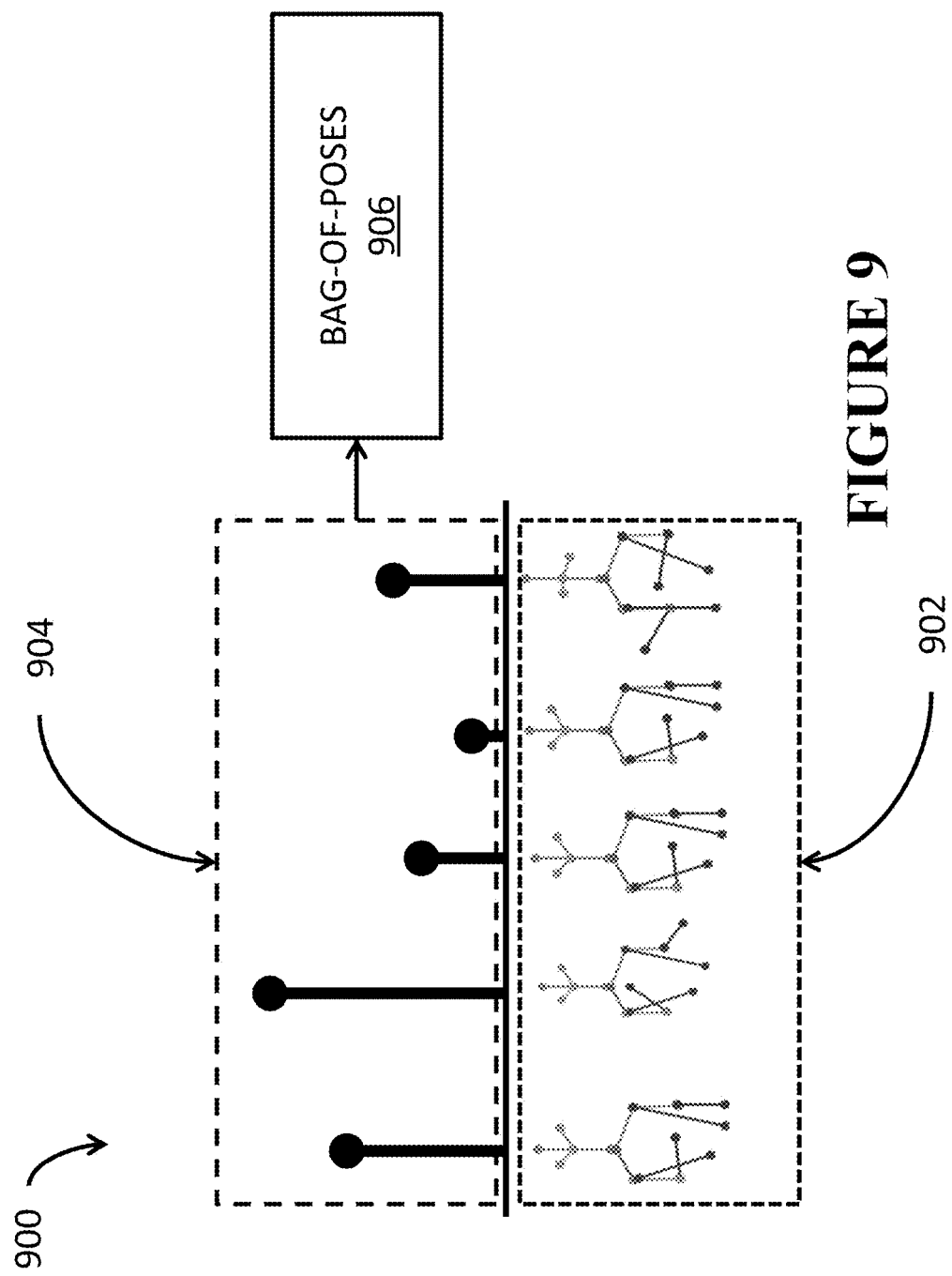
FIG. 9 shows a schematic diagram depicting normalized pose sequences and normalized histogram, according to some example embodiments of the present disclosure.

FIG. 9 shows a schematic diagram 900 depicting normalized pose sequences 902 and normalized histogram 904, according to some example embodiments of the present disclosure. The normalized pose sequences 902 are mapped into the normalized histogram 904. The normalized histogram 904 may include one or more bins that may be obtained based on k-means clustering of pre-trained human poses. In some embodiments, the normalized histogram 904 is mapped into a bag-of-poses 906 based on a pre-defined annotation of poses associated with the trained human poses.

Figure 10:
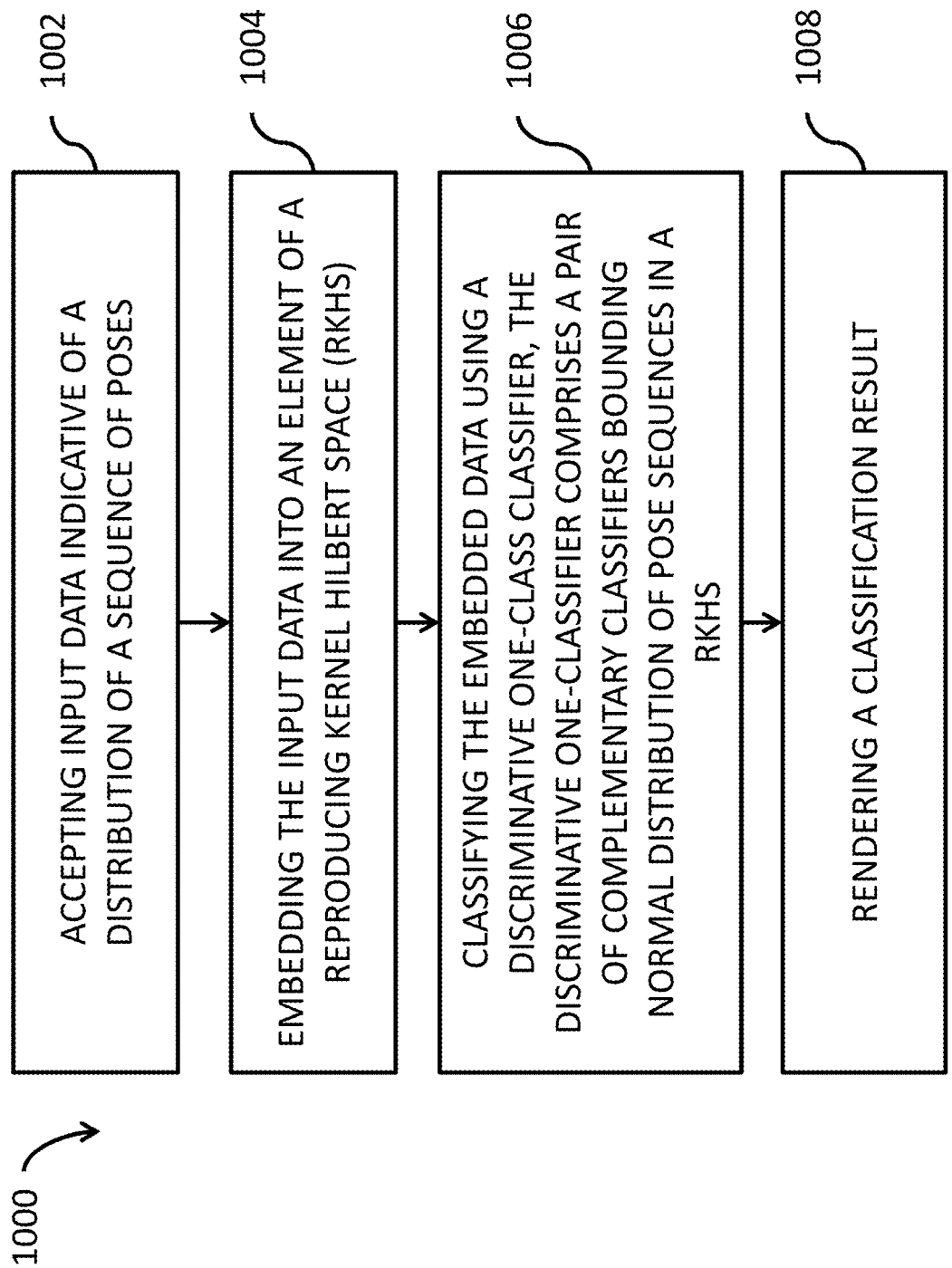
FIG. 10 shows a method flow for detecting an anomaly in a sequence of poses of a human performing an activity, according to some example embodiments of the present disclosure.

FIG. 10 shows a method flow 1000 for detecting an anomaly in a sequence of poses of a human performing an activity, according to some example embodiments of the present disclosure. The method 1000 is performed by the anomaly detector 106. At operation 1002, input data indicative of a distribution of the sequence of poses (e.g., the normalized pose sequences 802) is accepted. In some example embodiments, the distribution of the sequence of poses 802 corresponds to a set of images of a human performing an activity. In some other example embodiments, the input data may correspond to a sequence of image frames that includes one or more images of one or more occupants (e.g., the occupants 708A, 708B, 710A and 710B) in a vehicle (e.g., the vehicle 704).

At operation 1004, the input data is embedded into an element of a RKHS. The RKHS provides a linear space that enables projection of non-linearity of the input data mapped into the linear space.

At operation 1006, the embedded data is classified using the discriminative one-class classifier 206. The discriminative one-classifier includes a pair of complementary classifiers bounding normal distribution of pose sequences in the RKHS. Examples of the pair of complementary classifiers includes the pair of hyperplanes 302A and 302B, the pair of orthonormal frames 304A and 304C, the pair of hyperspheres 306A and 306B, and/or the like. In some embodiments, the discriminative one-class classifier 206 is trained based on a classification model. The classification model may correspond to at least a bag-of-words model, a convolutional neural network (CNN) model, or a deep-learning model. In some example embodiments, the discriminative one-class classifier 206 is trained to estimate data density of the normal distribution of pose sequences based on a min-max optimization technique. The min-max optimization technique is utilized to minimize distance between each classifier of the pair of complementary classifiers, and maximize the margin of each classifier of the pair of complementary classifiers from the normal data for maximum encapsulation of the normal distribution of pose sequences. The min-max optimization technique corresponds to Riemannian conjugate gradient algorithms.

At operation 1008, a classification result is rendered via the output interface 210 of the anomaly detector 106. The classification result may correspond to anomaly detected in the sequence of poses. The detected anomaly in the sequence of poses may be notified to the human performing the activity.

Figure 11A:
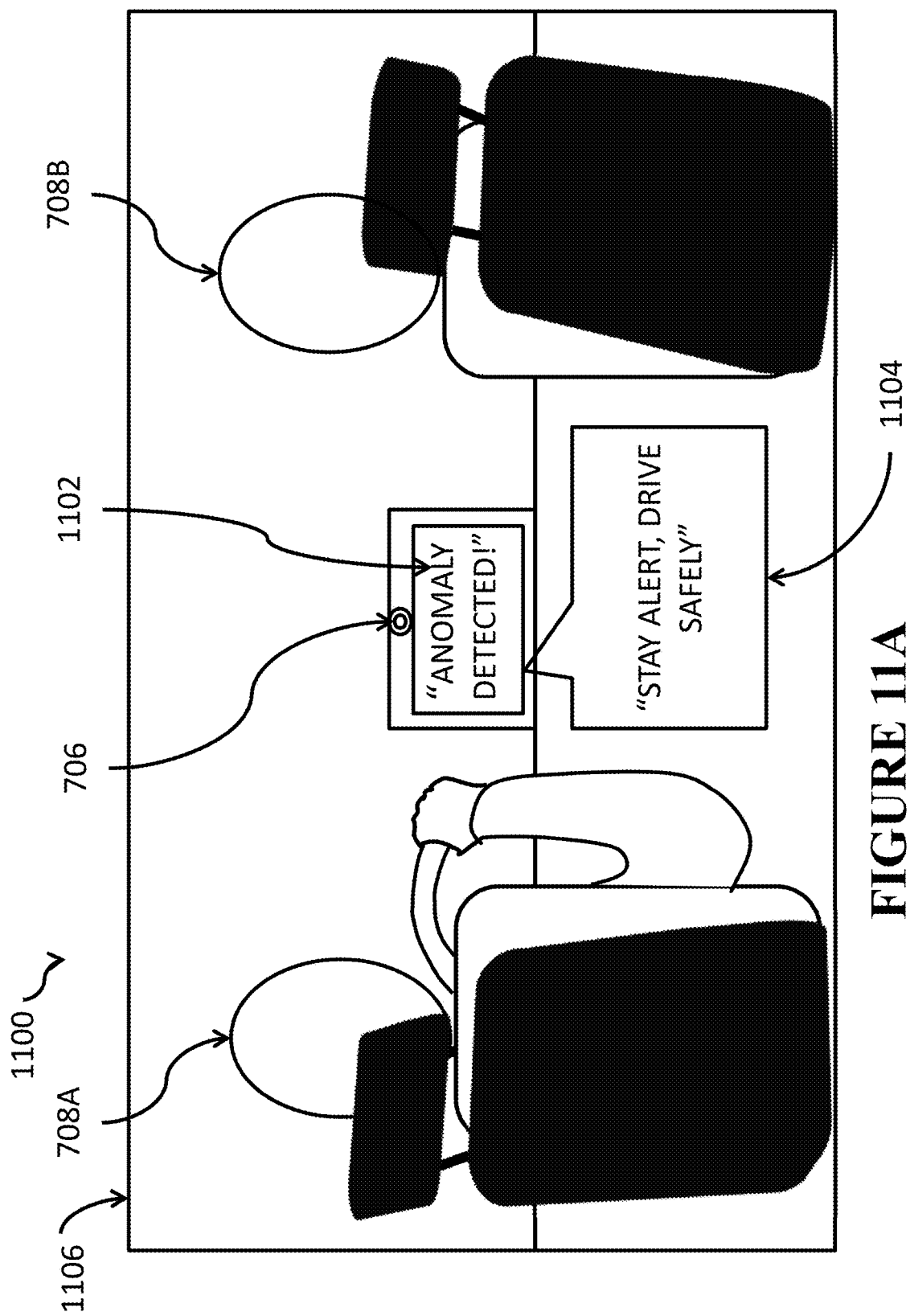
FIG. 11A illustrates a use case implementation of the anomaly detector, according to some example embodiments of the present disclosure.

FIG. 11A illustrates a use case 1100 implementation of the anomaly detector 106, according to some example embodiments of the present disclosure. The use case 1100 corresponds to a vehicle driver assistance system, e.g., the vehicle driver assistance system 702 of FIG. 7. The anomaly detector 106 may detect anomaly poses of one or more occupants in a vehicle, such as the occupant 708A and the occupant 708B (also referred to as the occupants 708A and 708B) in the vehicle 704.

In an illustrative example scenario, the occupant 708A driving the vehicle 704 may turn away from looking straight to a road ahead. Such poses of turning away may be captured by the camera 706. The camera 706 may provide these poses to the anomaly detector 106, via the vehicle driver assistance system 702. The anomaly detector 106 may detect these poses as anomaly poses and send an alert notification 1102 to the occupant 708A based on the detected anomaly poses. The alert notification 1104 may include an audio, a visual or a combination of audio-visual notification, such as "ANOMALY DETECTED!". Additionally, or alternatively, the alert notification 1104 may be followed by a reminder 1104 with a message "STAY ALERT, DRIVE SAFELY".

In some cases, both the occupants 708A and 708B may move and exhibit poses that may be anomalous. In such cases, the anomaly detector 106 may detect anomaly poses of each of the occupants 708A and 708B and generate the alert notification 1102 for each of the occupants 708A and 708B. In some example embodiments, the anomaly detector 106 may recognize poses of the occupants 708A and 708B based on human action recognition techniques, human activity recognition techniques, or the like.

Figure 11B:
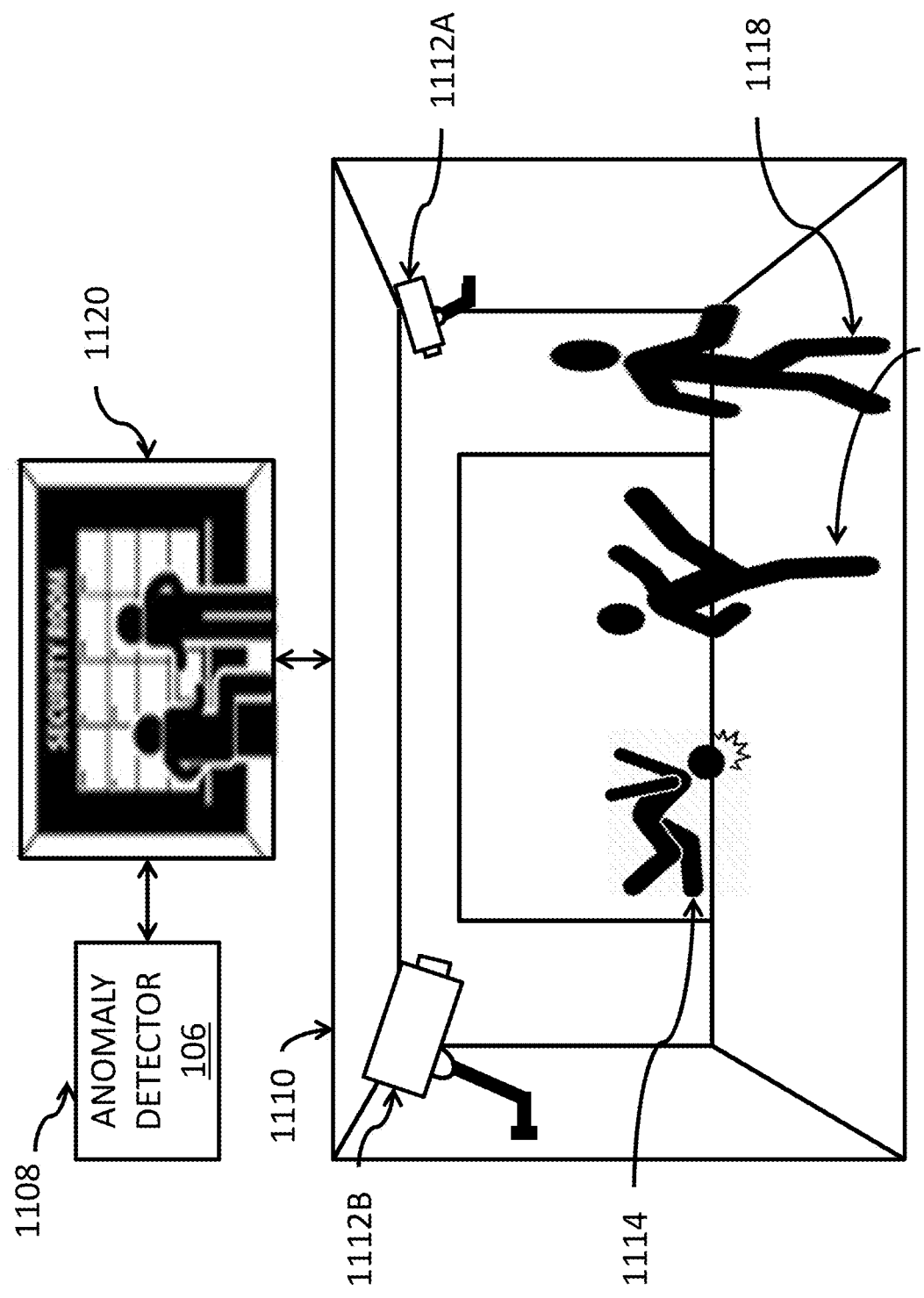
FIG. 11B illustrates a use case implementation of the anomaly detector, according to some other example embodiments of the present disclosure.

In a similar manner, the anomaly detection in human poses may be implemented in a security surveillance system, which is described in FIG. 11B.

FIG. 11B illustrates a use case 1108 implementation of the anomaly detector 106, according to some other example embodiments of the present disclosure. The use case 1108 corresponds to a security surveillance system 1120 of a location 1110. The location 1110 may include indoor area (e.g., a shopping mall, a bank location, a hospital care unit, etc.), an outdoor area (e.g., a park, a roadside, etc.) or the like. The location 1110 may be equipped with one or more cameras, such as a camera 1112A and 1112B.

In an illustrative example scenario, the location 1110 corresponds to a business area, such as a shopping mall equipped with the camera 1112A and 1112B installed at different points in the shopping mall. For instance, the camera 1112A may be installed at an entrance of the location 1110 and the camera 1112B may be installed at a different point in the location 1110, as shown in FIG. 11B. Each of the cameras, i.e. the camera 1112A and the camera 1112B captures events occurring in the location 1110. The captured events may include humans performing different activities. These captured events are provided to a security surveillance system 1120. The security surveillance 1120 is equipped with the anomaly detector 106. The anomaly detector 106 processes the captured events and detects anomaly events based on detection of anomaly poses in the different activities of the humans.

For instance, a person 1114 falls while walking towards the location 1110. The falling event of the person 1114 is captured by the camera 1112A. The captured falling event is streamed to the security surveillance system 1120. The security surveillance system 1120 transfers the falling event stream to the anomaly detector 106. The anomaly detector 106 detects falling poses as anomaly poses from normal walking poses. The anomaly detector 106 notifies an alerts signal to operators of the security surveillance system 1120 based on the detected anomaly poses. The operators may include security forces that are notified to help the person 1114.

In some cases, there may also be occurrence of unwanted events like fighting, theft, or the like in the location 1110. These unwanted events may also include human activities with poses that may be discriminated as anomaly. For instance, in front of a view of the camera 1112B, a person 1116 may attack another person 1118. The person 1116 may be initially in running poses followed by kicking poses. The other person 1118 may be initially in normal walking poses and suddenly start running poses due to attack by the person 1118. The camera 112B may capture a video stream of such poses and send to the security surveillance system 1120. The security surveillance system 1120 may send the video stream for processing by the anomaly detector 106. The anomaly detector 106 detects kicking poses of the person 1116 as anomaly poses and running poses of the person 1118 as anomaly poses. The anomaly detector 106 may notify the security surveillance system 1120 based on the detected anomaly poses. The security surveillance system 1120 alerts the operators based on the notification. In this way, the operators may handle and control such unwanted events, without having to manually monitor the security surveillance system 1120, in a feasible and efficient manner.

Alternatively, or additionally, the anomaly detector 106 may be implemented in different applications. For instance, the anomaly detector 106 may support processing of complex and non-linear data that correspond to different modalities, such as audio-based input data, textual-based input data and/or the like. The anomaly detector 106 may detect anomaly audio in the audio-based input data, which may be applied for detection of faulty equipment, music tutoring application, or the like. In a similar manner, the anomaly detector 106 may detect anomaly texts in the textual-based input data, which may be applied for fraud detection in textual documents, fraud detection in file transaction, or the like.

An overall block diagram of the anomaly detector 106 is shown and explained in FIG. 12.

FIG. 12 shows an overall block diagram of the anomaly detector 1200, according to some example embodiments of the present disclosure. The anomaly detector 1200 corresponds to the anomaly detector 106 of FIG. 1. The anomaly detector 1200 includes a processor 1204 configured to execute stored instructions, as well as a memory 1206 that stores instructions that are executable by the processor 1204. In some embodiments, the memory 1206 is also configured to store a discriminative one-class classifier 1208. The discriminative one-class classifier 1208 corresponds to the discriminative one-class classifier 206. The discriminative one-class classifier 1208 includes a pair of complementary classifiers.

In some example embodiments, the discriminative one-class classifier 1208 is accessed by the processor 804 for the anomaly detection in the sequence of human poses performing an activity. The processor 1204 corresponds to the processor 208. The processor 1204 can be a single core processor, a multi-core processor, a computing cluster, or any number of other configurations. The memory 806 can include random access memory (RAM), read only memory (ROM), flash memory, or any other suitable memory systems. The processor 1204 is connected through a bus 1216 to an input interface 1202. These instructions implement a method 1000 for detection of anomaly in a sequence of poses of a human performing an activity, such as the anomaly detection described in the use case 1100 of FIG. 11A, the use case 1108 of FIG. 11B, or the like.

In some implementations, the anomaly detector 1200 may have different types and combination of input interfaces to receive input data 1210. In one implementation, the input interface 1202 may include audio-video receiver (AVR), a keyboard and/or pointing device, such as a mouse, trackball, touchpad, joy stick, pointing stick, stylus, or touchscreen, among others.

Additionally, or alternatively, a network interface controller 1212 may be adapted to connect the anomaly detector 1200 through the bus 1214 to a network 1222. Through the network 1222, the input data 1210 may be downloaded and stored within the memory 1206 for storage and/or further processing.

Additionally, or alternatively, the anomaly detector 1200 may include a storage device 1220 for storing trained parameters of the pair of complementary classifiers of the discriminative one-class classifier 1208, annotated bag-of-poses for the anomaly detection in the input data 1210, or the like.

In addition to input interface 1202, the anomaly detector 1200 may include one or multiple output interfaces to output classification result rendered from the anomaly detection. For example, the anomaly detector 1200 may be linked through the bus 1214 to an output interface 1216 adapted to connect the anomaly detector 1200 to an output device 1218. The output device 1218 may include a computer monitor, projector, a display device, a screen, mobile device, an audio device, or the like.

In this manner, the anomaly detector 1200 detects anomaly poses in a sequence of human poses using a one-class classifier (e.g., the discriminative one-class classifier 1208). The discriminative one-class classifier 1208 using its pair of complementary classifiers bounds a normal distribution of pose sequences regardless of shape of the normal distribution of pose sequences, in an accurate manner. The Moreover, the pair of complementary classifiers is learnt in a reproducing Hilbert kernel space that ensures boundaries of the pair of complementary classifiers are linear, which improves computation of anomaly detection in the sequence of human poses. Further, the anomaly detection may be performed, without availability of training data corresponding to anomaly human poses. This reduces computational complexity of the anomaly detection of human activities.

The above-described embodiments of the present disclosure may be implemented in any of numerous ways. For example, the embodiments may be implemented using hardware, software or a combination thereof. When implemented in software, the software code may be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically, the functionality of the program modules may be combined or distributed as desired in various embodiments.

Also, the embodiments of the present disclosure may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments. Therefore, it is the object of the appended claims to cover all such variations and modifications as come within the true spirit and scope of the present disclosure.

The invention claimed is:

1. An anomaly detector for detecting an anomaly in a sequence of poses of a human performing an activity, comprising:
   an input interface configured to accept input data indicative of a distribution of the sequence of poses;
   a memory configured to store a discriminative one-class classifier having a pair of complementary classifiers bounding normal distribution of pose sequences in a reproducing kernel Hilbert space (RKHS);
   a processor configured to:
      embed the input data into an element of the RKHS; and
      classify the embedded data using the discriminative one-class classifier; and
   an output interface configured to render a classification result.

2. The anomaly detector of claim 1, wherein the processor is further configured to detect an anomaly, in the sequence of poses of the human performing the activity, based on the classified embedded data.

3. The anomaly detector of claim 2, wherein the processor is further configured to output a notification, to the human performing the activity, based on the detection of the anomaly.

4. The anomaly detector of claim 2, wherein the input data indicative of the distribution of the sequence of poses corresponds to a set of images of the human performing the activity.

5. The anomaly detector of claim 1, wherein the discriminative one-class classifier is trained based on a classification model, wherein the classification model corresponds to at least a bag-of-words model, a convolutional neural network (CNN) model, or a deep-learning model.

6. The anomaly detector of claim 5,
   wherein the discriminative one-class classifier is trained to estimate data density of the normal distribution of pose sequences based on a min-max optimization technique, and
   wherein the min-max optimization technique is utilized to:
      minimize distance between each classifier of the pair of complementary classifiers, and
      maximize margin of each classifier of the pair of complementary classifiers for maximum encapsulation of the normal distribution of pose sequences.

7. The anomaly detector of claim 6, wherein the min-max optimization technique corresponds to Riemannian conjugate gradient algorithms.

8. The anomaly detector of claim 1, wherein the input data corresponds to a sequence of image frames comprising one or more images of one or more occupants in a vehicle.

9. The anomaly detector of claim 8, wherein the one or more images of the one or more occupants are captured by one or more image capturing devices installed in a the vehicle.

10. The anomaly detector of claim 9, wherein the processor is configured to:
    detect a pose in each of the sequence of image frames based on one of pose estimation techniques;

filter a set of image frames with the sequence of poses from the sequence of image frames based on the detected poses;

match a pose in an image frame of the set of image frames to another pose in next image frame of the set of image frames, wherein the pose in the image frame is spatially close to the other pose in the next image frame; and generate the pose sequences from the filtered set of image frames based on the matching poses in the set of image frames.

11. The anomaly detector of claim 10, wherein the processor is further configured to:

prune joints from the detected pose in each of the pose sequences based on a detection score of corresponding joints in the detected pose below a pre-defined threshold;

normalize remaining joints in the detected pose in each of the pose sequences, wherein the remaining joints correspond to joints with detection score above the pre-defined threshold; and generate a vector representation corresponding to location coordinates of each pose in the normalized pose sequences.

12. The anomaly detector of claim 11, wherein the processor is further configured to:

embed each vector representation of each pose in the normalized pose sequences into a single sequence representation, as a normalized histogram, of a pre-defined dimension using the discriminative one-class classifier.

13. The anomaly detector of claim 12, wherein the processor is further configured to map the normalized histogram into a bag-of-poses based on a pre-defined annotation of poses associated with trained poses of a human activity, and wherein the normalized histogram comprises one or more bins obtained based on clustering of the trained poses of the human activity.

14. A method for detecting an anomaly in a sequence of poses of a human performing an activity, comprising:

accepting input data indicative of a distribution of the sequence of poses;

embedding the input data into a reproducing kernel Hilbert space (RKHS);

classifying the embedded data using a discriminative one-class classifier, wherein the discriminative one-classifier comprises a pair of complementary classifiers bounding normal distribution of pose sequences in the RKHS; and rendering a classification result.

15. The method of claim 14, further comprising:

detecting an anomaly, in the sequence of poses of the human performing the activity, based on the classification result; and outputting a notification, to the human performing the activity, based on the detection of the anomaly.

16. The method of claim 14, further comprising:

training the discriminative one-class classifier based on a classification model, wherein the classification model corresponds to at least a bag-of-words model, a convolutional neural network (CNN) model, or a deep-learning model.

17. The method of claim 16, further comprising:

estimating data density of the normal distribution of pose sequences based on a min-max optimization technique, wherein the min-max optimization technique is utilized to:

minimize distance between each classifier of the pair of complementary classifiers, and maximize margin of each classifier of the pair of complementary classifiers, and wherein the min-max optimization technique corresponds to Riemannian conjugate gradient algorithms.

18. The method of claim 17, further comprising:

capturing a sequence of image frames comprising one or more images of one or more occupants in a vehicle by one or more image capturing devices installed in the vehicle.

19. The method of claim 18, further comprising:

detecting a pose in each of the sequence of based on one of pose estimation techniques;

filtering a set of image frames with the sequence of poses from the sequence of image frames based on the detected pose; and matching a pose in an image frame of the set of image frames to another pose in next image frame of the set of image frames; and generating the pose sequences from the filtered set of image frames based on the matched poses in the set of image frames.

20. The method of claim 19, further comprising:

pruning joints from the detected pose in each of the pose sequences based on a detection score of corresponding joints in the detected pose below a pre-defined threshold;

normalizing remaining joints in the detected pose of each of the pose sequences, wherein the remaining joints correspond to joints with detection score above the pre-defined threshold; and generating a vector representation corresponding to location coordinates of each pose in the normalized pose sequences;

embedding each vector representation of each pose in the normalized pose sequences into a single sequence representation, as a normalized histogram, of a pre-defined dimension using the discriminative one-class classifier; and mapping the normalized histogram into a bag-of-poses based on a pre-defined annotation of poses associated with trained poses of a human activity, wherein the normalized histogram comprises one or more bins obtained based on clustering of the trained poses of the human activity.

* * * * *